United States Patent
Krantz

(10) Patent No.: US 8,025,132 B2
(45) Date of Patent: Sep. 27, 2011

(54) SYSTEM AND METHOD FOR REMOVING BRAKE DUST AND OTHER POLLUTANTS

(76) Inventor: Jeffrey Krantz, Honolulu, HI (US)

( * ) Notice: Subject to any disclaimer, the term of this patent is extended or adjusted under 35 U.S.C. 154(b) by 1179 days.

(21) Appl. No.: 11/631,984

(22) PCT Filed: Feb. 16, 2005

(86) PCT No.: PCT/US2005/005048
§ 371 (c)(1),
(2), (4) Date: Jan. 9, 2007

(87) PCT Pub. No.: WO2005/091838
PCT Pub. Date: Oct. 6, 2005

(65) Prior Publication Data
US 2008/0029357 A1  Feb. 7, 2008

(51) Int. Cl.
*F16D 65/00* (2006.01)
(52) U.S. Cl. .................................. 188/218 A; 55/385.3
(58) Field of Classification Search .............. 188/218 A; 55/385.3
See application file for complete search history.

(56) References Cited

U.S. PATENT DOCUMENTS

| 1,919,343 | A | * | 7/1933 | Payne | 188/2 R |
| 2,988,173 | A | * | 6/1961 | Romine | 188/218 A |
| 3,731,291 | A | * | 5/1973 | Walsh | 360/97.03 |
| 5,162,053 | A | * | 11/1992 | Kowalski, Jr. | 55/385.3 |
| 5,573,686 | A | * | 11/1996 | Lavicska | 219/202 |
| 5,681,072 | A | * | 10/1997 | Stricker | 296/39.3 |
| 6,592,642 | B2 | * | 7/2003 | Maricq et al. | 55/385.3 |

* cited by examiner

*Primary Examiner* — Bradley T King
*Assistant Examiner* — James K Hsiao
(74) *Attorney, Agent, or Firm* — Marian D. Walker; Luce, Forward, Hamilton & Scripps, LLP

(57) ABSTRACT

Systems and methods for capturing pollutants from braking mechanisms are provided. The systems can include a housing partially surrounding at least a portion of a vehicle brake assembly and disposed to receive brake dust from the brake assembly and a collector disposed to capture the brake dust received in said housing. A method can include providing the a providing a housing partially surrounding at least a portion of a vehicle brake assembly and disposed to receive brake dust from the brake assembly and a collector disposed to capture the brake dust received in said housing, creating a first air flow using the forward motion of the vehicle to move the pollutants from said housing to said collector, and capturing the brake dust in said collector.

2 Claims, 19 Drawing Sheets

SYSTEM AND METHOD FOR REMOVING BRAKE DUST AND OTHER POLLUTANTS

CROSS-REFERENCE TO RELATED APPLICATIONS

This application claims priority to and is a national phase application filed under 35 U.S.C. 371 of PCT/US2005/005048, filed Feb. 16, 2005, which designated the United States and was published in English and which claims priority to U.S. application Ser. No. 10/936,873 filed Sep. 9, 2004, which is a continuation-in-part of U.S. application Ser. No. 10/797,985 filed Mar. 9, 2004, all of which are hereby expressly incorporated by reference in their entireties.

FIELD OF THE INVENTION

The present invention relates to devices that remove pollutants from roadway surfaces. More specifically, the embodiments described herein include pollutant traps, such as porous filters, pads, or membranes, that attach to the under carriage of moving vehicles and collect roadway pollutants that are liberated from the road surface. Methods of using these devices to remove pollutants from the environment are also provided.

BACKGROUND OF THE INVENTION

According to the Environmental Protection Agency (EPA), nonpoint source pollution (NPS) is now the leading cause of water quality problems in America. NPS is caused by rainfall or snowmelt moving over and through the ground. As the runoff moves, it picks up and carries away natural and human-made pollutants, finally depositing them into coastal waters, lakes, rivers, wetlands and even our underground sources of drinking water. (See, for example, "Oil in the Sea" in *Pollution Equipment News*, dated October 2002.) These pollutants are many and varied, but they include oil, grease and toxic chemicals from urban runoff and energy production. Atmospheric deposition and hydromodification are also prime sources of NPS.

The accumulation of hydrocarbons and toxic metals on roadway surfaces is largely attributable to tailpipe emissions, tire tread wear, leaking automotive fluids, brake pad deterioration, and dirty car-washing water. (See U.S. Pat. No. 5,993,372, the entirety of which is hereby expressly incorporated by reference.) As tailpipe exhaust is emitted, for example, the many "fine" particles in the exhaust are either inhaled or they are filtered back down back down on to the street, waiting for rain to wash them into a storm sewer or for rolling tires to throw them back into the air (also referred to as "re-entrainment.") Fine particles, carbon monoxide, nitrogen oxides, volatile organic compounds, toxic organic compounds (e.g., toluene), and other heavy metals are all found in tail pipe exhaust. Additionally, as tire tread wears, pollution accumulates on roadway surfaces in the form of zinc, cadmium, carbon black, and fine particles of rubber. Furthermore, leaking oil, antifreeze, brake and transmission fluids, battery acid, grease and degreasing agents, also accumulate on the roadway surfaces. These automotive liquids contain toxic organic compounds and metals, as well. Brake pad dust is also a major source of roadway pollution and significantly contributes to the accumulation of copper in our waterways. In the San Francisco Bay, for example, brake pad dust is reported to be the largest source of copper pollution. (See "How Do Vehicles Pollute the Bay? Let's Count the Ways" available at the Palo Alto (Calif.) Regional Water Quality Control Plant web site)

The accumulation of roadway pollution is having a drastic effect on human health. In a study financed largely by the National Institute of Environmental Health Sciences, researchers calculated that the number of deaths from lung cancer increases by eight percent for every ten micrograms of fine particulate matter per cubic meter. The risk of dying from lung cancer as well as heart disease in the most polluted cities has been compared to the risk associated with nonsmokers being exposed to second-hand (cigarette) smoke over a long period of time. (See Jeanie Davis, "Air Pollution Increases Lung Cancer Risk; Evidence Links Bad Air with Heart Disease, Too" MSN and WebMD Medical News, Mar. 5, 2002.") Since the number of automobiles is increasing three times faster than the rate of population growth in the world and approximately 40% of deaths around the world can be attributed to various environmental factors, especially organic and chemical pollutants, the need for a device and method to remove these toxins from roadway surfaces is manifest. (See *BioScience*, October 1998 issue.)

Several different devices have been made to trap pollutants that are emitted from automobiles (e.g., U.S. Pat. Nos. 6,170,586, 5,711,402, 5,993,372, 5,967,200, 5,549,178, 5,692,547, and 6,524,992, all of which are hereby expressly incorporated by reference in their entireties). Although these devices and approaches reduce pollution by trapping the pollutants before they contact the roadway surfaces, there remains a significant need for devices and methods that remove pollutants that have already accumulated on roadway surfaces.

SUMMARY OF CERTAIN INVENTIVE ASPECTS

The invention includes embodiments of systems and methods for removing pollutants from a roadway surface. In one embodiment, the system includes a vehicle that comprises a pollutant trap that is mounted on the underside of the vehicle such that an exposed surface of the pollutant trap collects pollutants that are distributed onto the trap when a vehicle is driven over the roadway (e.g., pollutants liberated from the roadway surface by the tires of the vehicle, by the suction created under or through the vehicle during driving (e.g., passive airflow) or when suction is induced by a fan, blower, or vacuum, and pollutants liberated from the brake system as the brakes are applied). In some embodiments, the pollutant trap comprises a frame and/or a pad. In other embodiments, the pollutant trap comprising a pad or filter is part of the vehicle (e.g., built into the wheel well f the vehicle). In one embodiment, the pollutant trap comprises an ionic cleaning system that adds charged ions to the air and traps pollutant particles with electrostatically-charged collection plates. In other embodiments, the pollutant trap comprises a pad or filter (e.g., made of paper, cationic, anionic, a hydrophobic material, or mixtures thereof) that is affixed to the vehicle. In yet other embodiments, the system includes a fan, blower or vacuum that induces or focuses air and pollutants to the pollutant trap and, in still more embodiments, passive airflow generated by the rotation of the tires of the vehicle is focused to one or more filters placed on or in the vehicle.

The pollutant trap can be mounted on the interior of the wheel well of the vehicle at a position that collects the spray that is emitted from the tires of the vehicle as the vehicle travels over the roadway or at a position that allows for the pollutants that are sucked under the vehicle to contact the pollutant trap. In other embodiments, the pollutant trap is mounted on the mud flaps of the vehicle. The pollutant trap can be attached by several types of fasteners including, but not limited to, screws, glue, nails, clamps, hook and loop fasteners (e.g., VELCRO® brand hook and loop fasteners), and/or sleeves that hold the pollutant trap in place. In other embodiments, the wheel housing on the vehicle is modified or redesigned such that it is or incorporates the pollution trap. In another embodiment, the wheel housing is optimized to focus the pollutants, which are sucked under the vehicle or into the wheel housing, to the pollutant trap. In various embodiments, the pollutant trap can be an oleophilic pad, a hydrophobic pad, a hydrophobic and hydrophilic pad, a charged pad, an uncharged pad, a magnetic pad, or a pad that traps hydrocarbons or toxic metals, and combinations thereof. For example, the pollutant trap can comprise a positively charged plastic material that can attract negatively charged biological matter or a negatively charged material that attracts positively charged matter.

Other embodiments of the invention concern methods to remove pollutants from roadway surfaces. For example, in one embodiment, pollutants that are present on a roadway surface are dispersed under the vehicle (e.g., liberated by the tires, sucked under the vehicle by the vacuum created while driving, or by airflow created by a fan, blower, or vacuum or passive air flow generated by the rotation of the tires) and are captured by a pollutant trap that is mounted on the undercarriage of a vehicle or elsewhere on the vehicle so long as the flow of pollutants is focused onto the pollutant trap (e.g., a filter). Some embodiments include trapping the pollutants from the roadway surface in a pollution trap which is mounted inside the wheel well of a vehicle. Other embodiments include trapping the pollutants from the roadway surface in a pollutant trap mounted on the mud flaps of the vehicle. Another embodiment includes removing pollutants from a wet or dry roadway surface by liberating or disturbing the pollutants with a vehicle and collecting or trapping the pollutants in an exposed portion of a pollution trap mounted on the underside of the vehicle. Using the systems and methods of the invention described herein, roadway pollutants (e.g., hydrocarbons, volatile chemicals, and toxic metals) are removed from the environment.

Other embodiments of the invention include systems and for capturing a pollutant, comprising a brake assembly that comprises a movable braking surface, a brake pad positioned near the movable braking surface, the brake assembly configured to place the brake pad in contact with the braking surface, and a pollution trap positioned near the brake assembly such that the pollutant trap is exposed to pollutants generated from contacting the brake pad and the brake surface. The pollution trap can comprise a pollutant trap pad (e.g., a filter or pollutant collector) that binds a pollutant contacting said pad so that the pollutant is captured by the pollution trap. The system can further comprise a pollutant deflector positioned between a wheel connected to the braking surface and the braking surface, where the pollution trap is disposed on the side of the deflector shield facing the braking surface.

Another embodiment of the invention includes a system for capturing a pollutant generated by placing a brake pad in contact with a moving braking surface, comprising a pollution trap comprising a material for binding a pollutant so as to capture the pollutant in the pollution trap, the pollution trap being positioned relative to a brake pad and a braking surface such that the material is exposed to the pollutant generated when the brake pad contacts the braking surface when the braking surface is moving. The system can further comprise an automobile, wherein the pollution trap, the brake pad and the braking surface are disposed on the automobile. In some embodiments, the system comprises a brake assembly comprising the brake pad and the braking surface, and wherein the pollution trap is connected to the brake assembly. In some embodiments, the pollution device is positioned between an inner portion of a wheel rim and at least a portion of the braking surface, the wheel rim having the inner portion facing towards the braking surface and an outer portion facing away from the braking surface, the wheel rim being connected to the braking surface such that slowing the movement of the braking surface also slows the movement of the wheel rim. In some embodiments, the pollution trap is connected to the wheel rim. In another embodiment, the system further comprises a magnet positioned in a location relative to a point where the brake pad contacts the braking surface during braking such that said magnet is exposed to a pollutant resulting from contacting the braking surface with the brake pad.

In another embodiment, a method for capturing a pollutant generated by the contact of a brake pad with a moving surface used for braking comprises positioning a pollution trap between a wheel of a vehicle and at least a portion of a moving surface connected to the wheel and used for braking, exposing a pollutant trap pad held by the pollution trap to a pollutant generated by contacting a brake pad with the moving surface used for braking, and capturing the pollutant on the pollution trap pad.

In another embodiment, the invention includes a system for a capturing a pollutant from a vehicle brake assembly, including a housing partially surrounding at least a portion of a vehicle brake assembly and disposed to receive brake dust from the brake assembly, and a collector disposed to capture the brake dust received in said housing. In some embodiments, the collector comprises a filter. In some embodiments, the brake dust collector is disposed inside the housing. The housing can include a cover including a plurality of openings. In some embodiments, the collector is disposed between said cover and the brake assembly. The cover can be removable for access to said filter. In some embodiments, the cover and the filter are formed as an integrated piece. In some embodiments, the filter is renewable by cleaning. The brake dust collector can be disposed external to said housing, and the system can include conduit connected to the collector and the housing for moving brake dust from said housing to said collector. In some embodiments, the conduit comprises a flexible hose. The collector can include an air exhaust, that can be disposed relative to a first air flow created by the vehicle moving forward so that a second air flow is created to move the brake dust from the housing through the conduit and into the collector by the venturi effect.

In another embodiment of the invention, the system for a capturing a pollutant from a vehicle brake assembly, includes a rotor shroud covering at least a portion of a brake rotor and disposed to receive brake dust generated during braking, and a collector disposed to capture the brake dust received in said rotor shroud. In some embodiments, the collector comprises a filter.

In yet another embodiment, the invention comprises a method for capturing brake dust on a moving vehicle, the method including providing a system for collecting brake dust as described herein, creating a first air flow using the forward motion of the vehicle to move the pollutants from said housing to said collector, and capturing the brake dust in said collector. In some embodiments, the first air flow is created by creating a suction by exhausting air passing through the collector into a second air flow created by the forward motion of the vehicle. In some embodiments, the collector comprises a filter.

In another embodiment, the invention includes a system for capturing pollutants from a wheel well opening of a vehicle, including a wheel well comprising a surface having a plurality of openings, wherein the surface openings are exposed to pollutants in the wheel well opening partially surrounded by said wheel well, an air channel disposed along at least a portion of said wheel well surface so that the surface is between said air channel and said plurality of openings, said air channel comprising an air intake port and an air outlet port, and said air channel generating a first air flow in the air channel and a resulting second air flow to move pollutants in the wheel well opening through said plurality of openings and towards the air channel when the vehicle is moving forward, a filter positioned between said air channel and said plurality of openings, wherein said filter comprises a first surface disposed along said air channel and exposed to said air channel, and a second surface disposed proximate to the plurality of openings so that at least a portion of pollutants moving through said plurality of openings towards said air channel are captured by said filter. In some embodiments, the system includes a de-icer positioned on wheel well for melting snow or ice accumulated on the wheel well, and a power source connected to said de-icer, said de-icer configured to produce heat when energized by said power source.

In another embodiment, the invention includes a method for capturing pollutants on a moving vehicle, the method including providing a system as described above, creating the first air flow by the forward motion of the vehicle, the first air flow creating a suction along said filter, creating the second air flow from the suction to move the pollutants from a wheel well opening to said filter, wherein the second air flow is created by exhausting air passing through the filter into the first air flow, moving pollutants existing in the wheel well opening through the plurality of openings in the surface of the wheel well and through the filter using the second air flow, and capturing the pollutants in said filter.

DETAILED DESCRIPTION OF CERTAIN INVENTIVE EMBODIMENTS

Figure 1:
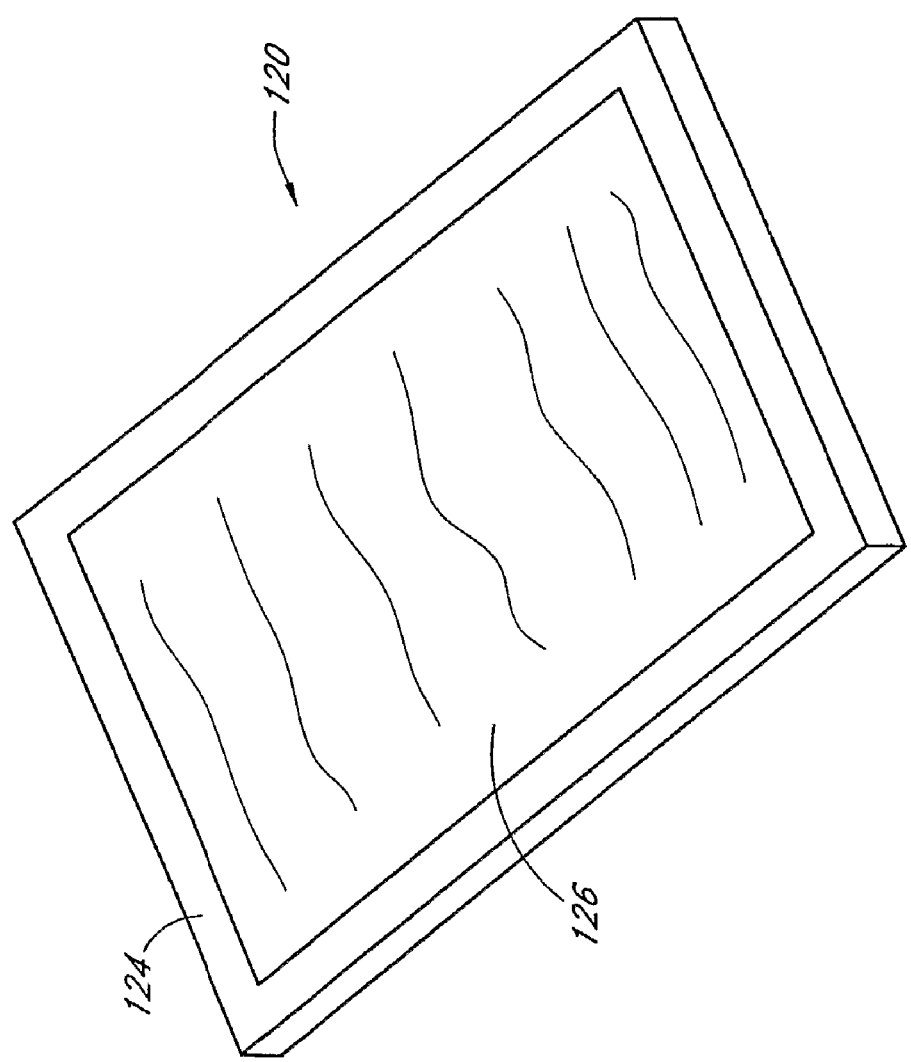
FIG. 1 is a perspective view of a pollutant trap in accordance with the preferred embodiments of the present invention.

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Devices and methods for trapping pollutants that accumulate on roadway surfaces have been developed and are described herein with reference to the accompanying figures. In several embodiments, the device comprises a pollutant trap that is affixed to the undercarriage of a vehicle at a position that allows the trap to collect and/or bind roadway pollutants as they are liberated from the roadway surface (e.g., pollutants that are liberated by the tires of the vehicle while driving, pollutants sucked under the vehicle by the vacuum created while driving (e.g., pollutants contained in the airflow generated passively while driving the vehicle), or pollutants forced under the vehicle or focused on to a filter by the airflow created by a fan, blower, or vacuum). Forced induction or suction of air using, for example, blowers, motors, or fans, can be used to increase the air flow and the flow of roadway pollutants to the pollutant trap. For example, forced induction or suction of air can be used to increase the flow of roadway pollutants to the pollutant trap when the vehicle is not moving fast enough to create a sufficient air flow to the pollutant trap. Embodiments of the invention include a pollutant trap (e.g., a pad, filter or membrane) that is affixed to the wheel wells, splash guards, or mud flaps of a vehicle at a position that collects roadway spray (e.g., rainwater or roadway dust) generated by the wheels of the vehicle or at a position that allows for contact with roadway pollutants that are sucked under the vehicle by the vacuum created while driving or by forced air induction (e.g., fan, blower, or vacuum). The pollutant trap can be composed of many different materials and is, preferably, composed of a material that binds hydrocarbons, toxic metals, oils, tars, fuels, lubricants, organic chemicals, pesticides, bacteria, asbestos, salt from de-icing and the like.

A vehicle equipped with a pollutant trap (e.g., a hydrocarbon filter affixed to the roadway splash zone of the wheel wells) can be used to reduce the amount of hydrocarbons on a roadway surface by simply driving the vehicle over the roadway surface. As the tires liberate roadway pollutants, for example, by pulling a slurry of pollutants and water from a wetted roadway surface or creating an aerosol of pollutant-laden dust from a dry roadway surface, the pollutants are brought into contact with the pollutant trap and affixed thereto, thereby reducing the amount of pollutants on the roadway surface.

Additionally, as a vehicle drives over a roadway surface, a vacuum is created under the vehicle, in particular at positions on the wheel well. The vehicle induced vacuum can be so considerable that it is thought to be the cause of several accidents whereby bicyclists are drawn into the wheels of passing busses (See *J. Natl. Acad. of Forensic Engineers*, vol. XVIII, No. 1, June 2001). As velocity increases, the pressure near the wheels of the vehicle decreases creating the vacuum. One embodiment of this invention utilizes this vacuum such that roadway pollutants that are liberated from the road surface are sucked under the vehicle and are disposed onto pollutant traps that are positioned under the vehicle and/or in the wheel wells of the vehicle, thereby reducing the amount of pollutants on the roadway surface.

A vehicle equipped with a pollutant trap (e.g., a hydrocarbon filter affixed to the wheel wells) and a pollutant liberator (e.g., a fan, a blower, a vacuum that is affixed to the vehicle in a manner that generates airflow, preferable a vacuum, so as to bring pollutants in contact with the filter pad) is provided. The combination of the pollutant trap and pollutant liberator can improve the amount of pollutant collected onto the pollutant trap, especially when the vehicle is maintained at low rates of speed.

FIG. 1 shows a pollutant trap 120 in accordance with a one embodiment. The pollutant trap 120 not only prevents damage to the vehicle but, more importantly, removes pollutants from the roadway surface, by collecting the environmental pollutants as they are disturbed from the roadway surface. In some embodiments, the pollutant trap 120 separates the environmental pollutants from water, or other non-polluting roadway fluids. In some embodiments, the pollutant trap 120 may also solidify the pollutants.

In the embodiment shown in FIG. 1, the pollutant trap 120 includes a housing 124 and a pollutant trap pad 126. The housing 124 can be any type of structure that holds the pollutant trap pad, for example, a frame that "holds" the pollutant trap pad 126 and exposes both sides of the pad 126 for collecting pollutants. In another example embodiment, the housing can be a structure that holds the pollutant trap pad 126 and exposes one side pad 126 for collecting pollutants. In certain embodiments, the pad 126 can be arranged such that at least one surface is exposed to the roadway, wheel, or wheel well. In another embodiment, the pollutant trap 120 comprises a pollutant trap pad 126, without a housing 124. When referring herein to a structure or a frame that "holds" the pollutant trap pad 126, numerous types of embodiments are contemplated including where the pollutant trap pad is attached, in any way (e.g., via clips, snaps, hook and loop fasteners, buttons, adhesive, screws, fasteners with interlocking male and female parts, mechanical pressure, etc.) to the structure, the attachment being either permanently or removably.

As will be described in detail hereinafter in FIG. 4, the pollutant trap 120 can be attached to any part of a vehicle that exposes the pollutant trap pad 126 to roadway pollutants (directly or indirectly), including the underside of a vehicle, or the wheel housing. The wheel housing (or wheel well) of a vehicle can be designed such that it improves the vacuum under the vehicle or into the wheel well and thereby focuses airflow containing the pollutants onto the pollutant trap pad 126.

Figures 2, 3:
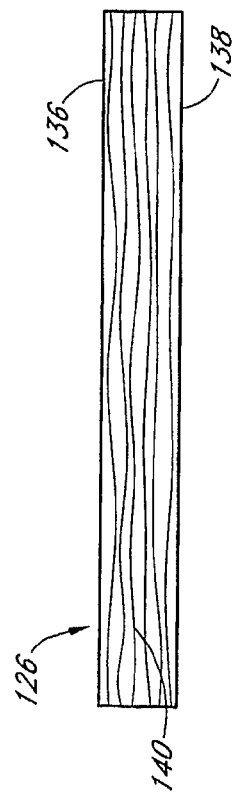
FIG. 2 is a front view of a pollutant trap.
FIG. 3 is a side view of a pollutant trap.

As shown in a top or bottom broad surface view in FIG. 2, the pollutant trap pad 126 can comprise a pollutant trap material 130 which may comprise, for example, a membrane, sponge or a filter, that collects hydrocarbons and/or toxic metals. In some embodiments, the pollutant trap material 130 can bind, collect, catch and/or retain pollutants. In some embodiments, the pollutant trap pad 126 can comprise material that can repel water or other non-polluting roadway fluids. In one embodiment, the pollutant trap material 130 comprises a quilted absorbent pad for placement on the vehicle. In another embodiment, pollutant trap material 130 comprises a plurality of pores 132 that help the pollutant trap material 130 bind, collect, catch and/or retain pollutants.

In one embodiment, the pollutant trap material 130 comprises an absorbent sponge, which can be from an animal or synthetic source. Sponges that can be used in certain embodiments of the invention include the pollutant trap 120 described in U.S. Pat. No. 5,039,414, the entirety of which is herein incorporated by reference. In some embodiments, the pollutant trap pad 126 comprises organisms or chemicals that degrade and/or convert the pollutant into a non-polluting material (e.g., oil degrading bacteria, spore or bactericidal compounds).

FIG. 3 shows an edge view of a pollutant trap 126. The pollutant trap pad 126 has a top portion 136 and a bottom portion 138. The pollutant trap pad 126 can also include a plurality of layers 140. In some embodiments, all of the layers can have the same properties. In other embodiments, each of the layers 140 of the pollutant trap pad 126 can have different properties. For example, it may be desirable for the layers 140 at of near the top portion 136 to have hydrophobic properties (water-repellant), and/or layers 140 at or near the bottom portion 138 to have oleophilic properties (oil-attracting). In some embodiments, the pollutant trap pad 126 may include a coating, for example, a coating comprising a chemical or an organism, which provides the pollutant trap pad 126 with additional desirable properties.

In some embodiments, the pollutant trap pad 126 may be oleophilic, hydrophobic, or both oleophilic and hydrophobic. In other embodiments, the pollutant trap pad 126 may be cationic anionic or mixtures of hydrophobic, cationic, and anionic materials. The pollutant trap pad 126 can comprise of materials that use absorption, adsorption, encapsulation, microencapsulation, volatilization, sedimentation, re-suspension, desorption, oxidation/reduction, complexation/chelation, precipitation, or biological uptake, or combinations thereof to remove the pollutants from the roadway.

In some embodiments the pollution trap pad 126 comprises sorbent material (referred to herein as "sorbents") that may be absorbent, adsorbent, or both. Absorbent materials are those that pick up and retain liquid distributed throughout its molecular structure. Adsorbent materials are insoluble materials that are coated by a liquid on its surface, including pores and capillaries. Sorbents can be natural organic, natural inorganic, or synthetic. Natural organic sorbents may include peat moss, straw, hay sawdust, ground corncobs, feathers, paper and other carbon-based materials. One example of a natural product that may be used is treated peat, available under the trade name "OCLANSORB", manufactured by Hi Point Industries, Newfoundland, Canada. Natural inorganic sorbents may include clay, perlite, vermiculite, glass wool, sand, volcanic ash, and the like. Synthetic sorbents may include plastics, such as polyurethane, polyethylene, and polypropylene, cross-linked polymers, rubber materials, gels, colloids, and the like. Preferably, combinations of absorbent materials are employed, which can be intermixed or provided in separate layers.

Many different types of absorbent material are known in the art, any of which can be incorporated into an embodiment of the pollutant trap 120 described herein. For example, some embodiments of the pollutant trap 120 include materials designed to collect salts that accumulate on roadways as a result of salting the roadways during the winter months. A suitable absorbent material for a pollutant trap pad 126 that collects roadway salt is described in U.S. Pat. No. 6,526,741, herein expressly incorporated by reference in its entirety. Alkali metals such as sodium and potassium salts can be readily absorbed to the absorbent material found in the Aqua Sep™ filter available from the Pall Process Filtration Company, Hydrocarbon, Chemical, Polymer Group. Use of this absorbent material in the pollution trap 120 described herein is contemplated. Similarly, the use of a magnetized absorbent material is known in the art and this technology can also be readily employed in the embodiments describe herein. (See e.g., U.S. Pat. No. 6,524,457, herein expressly incorporated by reference in its entirety).

Embodiments of the pollutant trap 120 can include many additional types of suitable membranes or filters that can be used alone or in combination with other membranes and filters described herein. For example, in various embodiments, the pollutant trap 120 can include one or more of the filtering materials produced by ESFIL TECHNO (a company located in company is located in North-East Estonia, within the territory of a free economic zone in an industrial part of Sillamae city), and the choice of filtering material can depend on the roadway pollutant(s) targeted for removal. In some example embodiments, the pollutant trap 120 can include a filtering polymer material ("FPM"), which is available from ESFIL TECHNO, and which is chemically stable to diluted acids, alkalis, alcohols, saturated hydrocarbon, glycerin, oils, petroleum and fresh water, and have a temperature range of maintenance from −30° C. up to +70° C. In other embodiments, the pollutant trap 120 can include a perchlorovinyl filtering material ("FPP"), which is available from ESFIL TECHNO, and which is chemically stable to strong acids and alkalis, alcohols, and saturated hydrocarbon, and has a working temperature range from −200° to 60° C. Examples of filtering materials that can be used in the pollutant trap 120 from ESFIL TECHNO includes, but is not limited to, FPP-D (generally used for thin air and gas filtering), FPP-D-4 (generally used for thin purification of liquids, fuels, oils including aviation oil, particles, air and gasses), FPP-G (generally used for purification of alcohols, acids and alkalis), POROFIL-G-5/206 (generally used for deleting of particles of more than five microns, and POROFIL-G-1/207 (intended for purification of perfumery liquids, alcohols, saturated hydrocarbons, oils, acids, technical and de-ionized water and aqueous solutions from mechanical impurities), FPAR-15-1.5 (generally used for filtering thin gases and air), and FPSF-15-1.5 (generally used for thin clearing of air from aero disperse mixtures, including microorganisms, bacteria and viruses).

Although the pollutant trap 120 can comprise various materials that can be used as filters in other applications, or referred to herein as "filters" or "filter material," the use of these such materials does not necessarily require an air-flow passing through the material when it is used in a pollutant trap, although in some cases the air-flow can pass through the material. Rather, an air-flow carrying roadway pollutants need only place the pollutants in proximity to the filter material so that the roadway pollutants are collected on, in or are bound to the filter material. In some embodiments, the airflow carrying the pollutants is directly applied to the filter material (e.g., passive airflow or vacuum generated by the rotation of the wheels of the vehicle is focused by louvers present in the wheel well onto filters present in the wheel well of the vehicle). In other embodiments, the airflow carrying the pollutants is transferred onto the filter indirectly (e.g., the passive airflow or vacuum generated by the rotation of the wheels is collected and transferred through a hose to a filter material housed at any position in or on the vehicle (e.g., in the trunk). In some embodiments, the pollutant trap 120 may comprise materials that have a high tolerance for heat, e.g., materials that have pollutant collection properties that are not affected by high temperatures, and/or materials that have a high combustion point, allowing the pollutant trap 120 to be disposed in locations on a vehicle subject to high temperatures, e.g., in proximity to the engine or the exhaust system.

Another common roadway pollutant that causes significant environmental damage are ether-based contaminants such as tertiary butyl ethers of the type utilized as gasoline oxygenates, for example, methyl tert-butyl ether (MTBE), ethyl tert-butyl ether, and methyl tert-amyl ether, and also ether solvents, for example, tetrahydrofuran. The full extent of MTBE contamination in US groundwaters has only recently been understood. A study performed as part of the US Geological Survey's National Water-Quality Assessment Program revealed that MTBE is the second most commonly detected contaminant in urban groundwaters (Squillace P. J., J. S. Zogorski, W. G. Wilber, and C. V. Price. "Preliminary assessment of the occurrence and possible sources of MTBE in groundwater in the United States, 1993-1994". Environ. Sci. Technol. 30:1721-1730 (1996)). Several different absorbent materials are known to trap the ether-based contaminants, in particular, MTBE, as well as, oils and greases. (See e.g., U.S. Pat. Nos. 5,437,793, 5,698,139, 5,837,146, 5,961,823, 6,524,842, 6,180,010, 6,475,393, and 5,614,100, all of which are hereby expressly incorporated by reference in their entireties).

With many of the embodiments, a suitable absorbent material, such as the absorbent material described in U.S. Pat. No. 6,475,393, or a similar material, may be preferred for the pollutant absorbent pad 126 because it efficiently collects oils, greases and the like, but also traps pernicious slightly soluble organic compounds such as benzene, toluene, xylene, halogenated hydrocarbons, ethoxylated glycols, etc. These noxious contaminants are among the more difficult compounds to remove from water and are carcinogenic. This absorbent material can also remove metal ions such as cadmium, chromium, copper, lead, nickel, zinc, arsenic, silver, and mercury. Example 1 below describes one way to manufacture this absorbent material.

Example 1

In order to prepare a filter substrate for use with the invention, an infusion solution is prepared from a suitable solvent and the absorbent composition. In this example a solution is prepared from 90 w/w 99.9% acetone and 10 w/w absorbent composition, which is the reaction product of 31% isobutyl methacrylate, 31% ELVACITE 2045, and 66% linseed oil. The absorbent composition is added to a closed explosion-proof mixer with the acetone and mixed for 12 hours or until the solution becomes homogeneous. The substrate in this Example is a nonwoven polypropylene, viz. the VERASPUN material of Yarorough & Co., Inc. of High Point N.C. This material has a weight of 1 oz./square ft. The substrate material is immersed in the infusion solution until saturated, then removed and excess liquid allowed to drip off. The material is then placed in a convection oven at 110 to 120° F. until acetone free. The material is then cured at room temperature for one week. The resulting material is then shredded and subsequently formed in various filter configurations (e.g., to fit in the wheel well of a vehicle).

Figure 4:
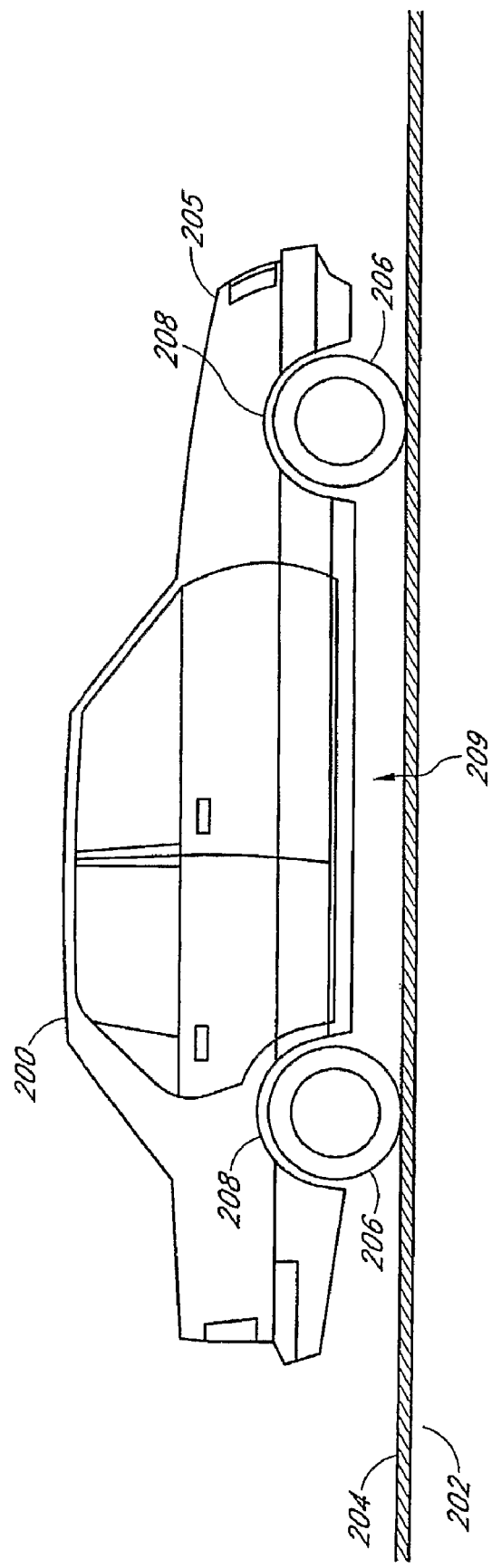
FIG. 4 is schematic view of a vehicle on a roadway.

With reference to FIG. 4, a vehicle 200 is shown on a roadway 202. The roadway 202 is shown with a layer of pollutants 204 disposed on the roadway 202, as is generally known to occur. The vehicle 200 includes a vehicle body 205 and wheels 206, which are shown to be at least partially surrounded by a wheel well 208. The vehicle body 205 includes an underside 209 which is exposed to the roadway 202. As the vehicle 200 moves along the roadway, the pollutants 204 are disturbed by the rotating wheels 206. The pollutants 204 are carried off the roadway 202 due to their contact with the wheels 206 and/or due to the vacuum created under and around the moving vehicle 200. The rotation of the wheels 206 can result in a spray of pollutants that can damage the vehicle and the environment. This situation is exacerbated when it rains. The rain causes the pollutants to rise to the surface of the roadway, creating unsafe driving conditions and increased damage to the environment. Since the wheels 206 are in direct contact with the roadway 202, the pollutant concentration is greatest near the wheels 206 and, in particular, at the wheel well 208 of the vehicle.

The spray of pollutants results from a wind-tunnel effect created by the rotation of the wheels 206. Studies have confirmed that the rotating wheels of a vehicle create low pressure at the wheel, causing objects to be drawn toward the wheel. See, for example, "The Causal Factor of Bus Wheel Injuries and a Remedial Method for Prevention of These Accidents" by James M. Green in *Journal of the National Academy of Forensic Engineers*, Vol. XVIII, No. 1, dated June 2001.

Figure 5:
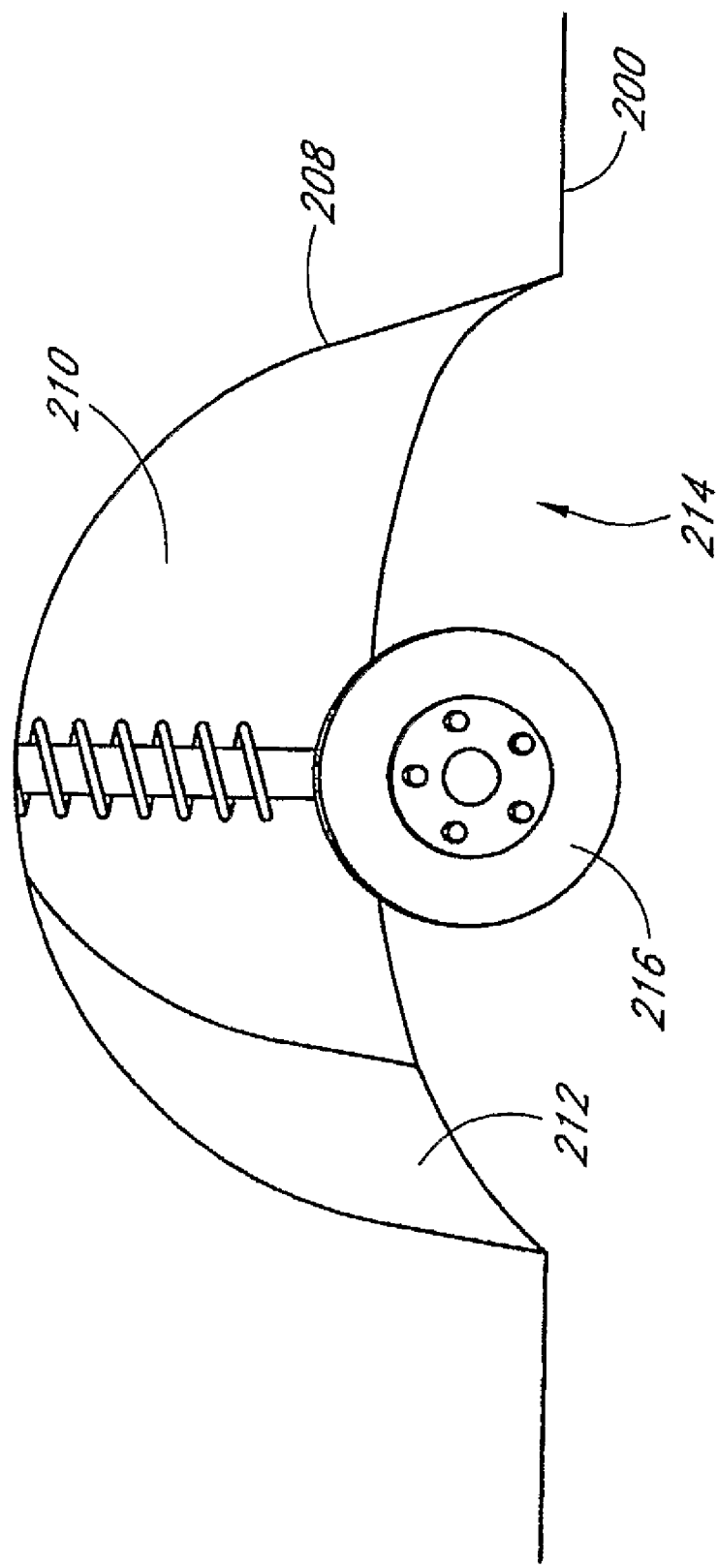
FIG. 5 is a detailed perspective view of the wheel well of a vehicle.

Referring to FIG. 5, a detailed view of the vehicle wheel well 208 is shown where the wheel well 208 does not include a pollutant trap. The wheel well 208 includes an inner surface 210, a transition surface 212, and an opening 214. The transition surface 212 connects the inner surface 210 to the body 205 of the vehicle 200, such that a partially open housing is formed. The wheel well 208 partially houses the wheel 206 and wheel assembly 216.

Figure 6:
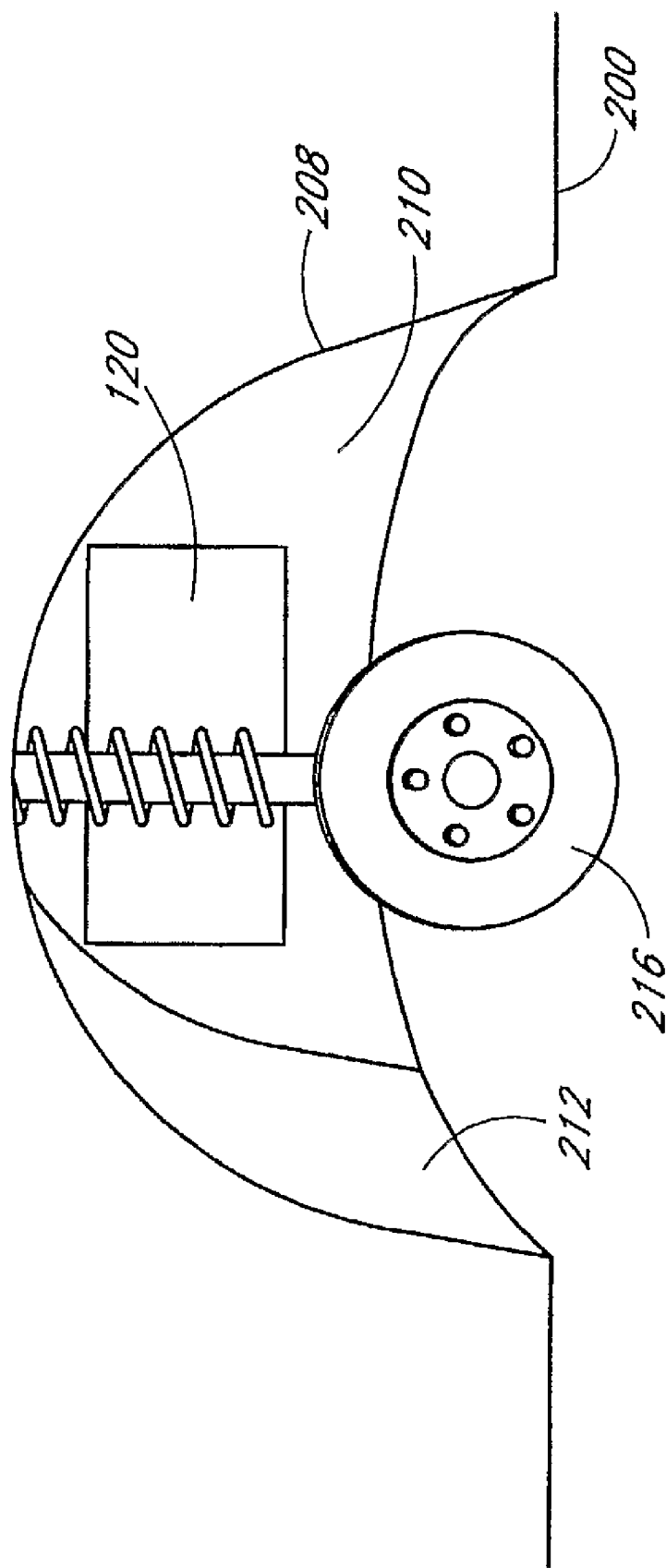
FIG. 6 is a schematic view of the pollutant trap of FIG. 3 used on the wheel well of a vehicle.
Figure 7:
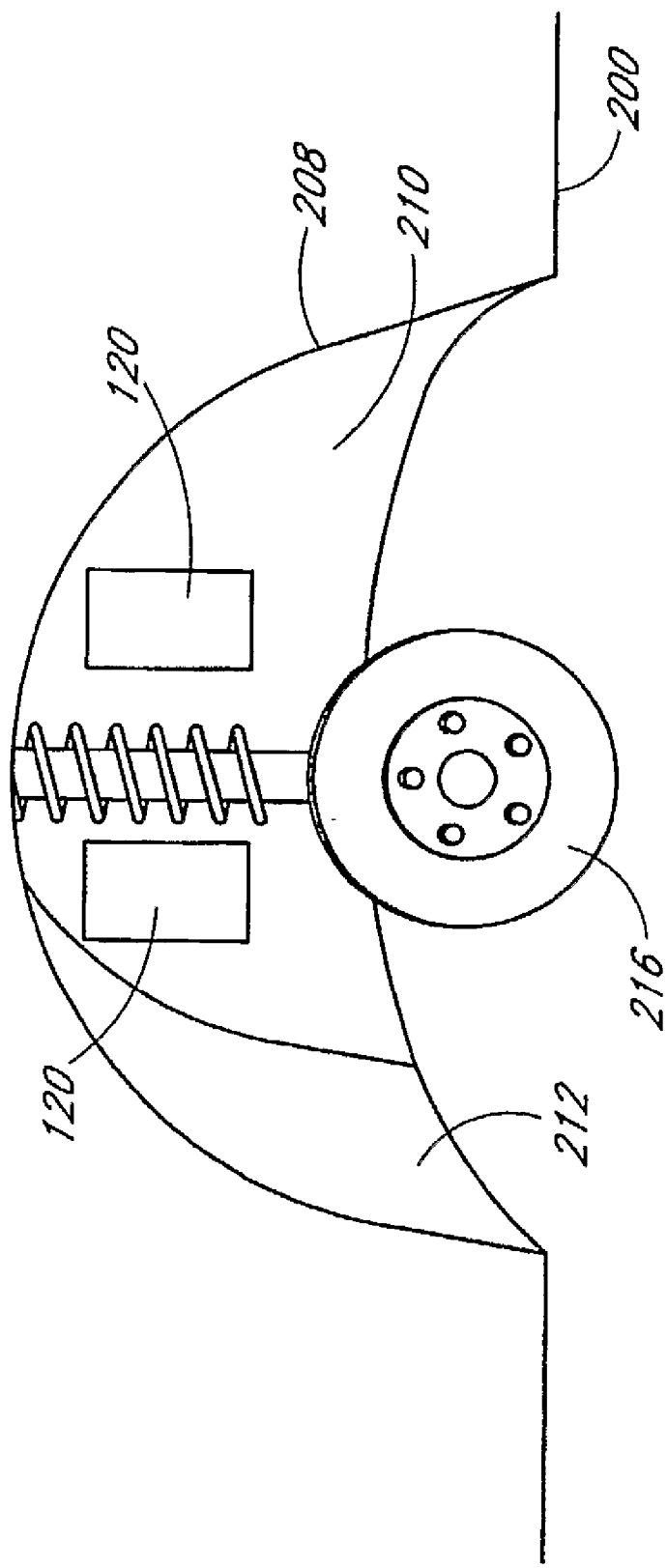
FIG. 7 is a schematic view of the pollutant trap of FIG. 3 used on the wheel well of a vehicle.
Figure 8:
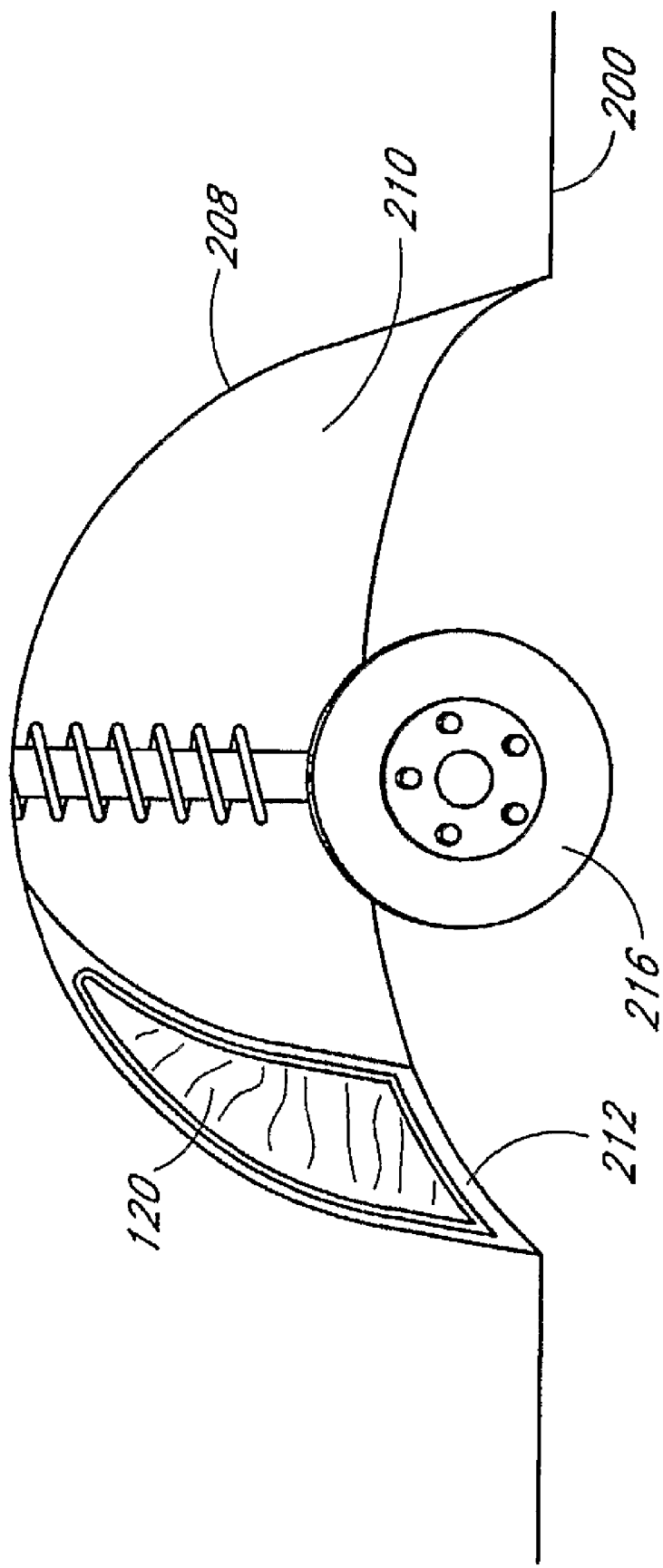
FIG. 8 is a schematic view of the pollutant trap of FIG. 3 used on the wheel well of a vehicle.

With reference to FIGS. 6-8, the pollutant trap(s) 120 is shown attached to the wheel well 208 of a vehicle 200. FIG. 6 shows a pollutant trap 120 attached to the inner surface 210 of the wheel well 208. FIG. 7 shows multiple pollutant traps 120 attached to the inner surface 210 of the wheel well 208. FIG. 8 shows a pollutant trap 120 attached to the transition surface 212 of the wheel well 208. As described hereinabove, since the greatest concentration of roadway pollutants is at the wheel well of a vehicle, it may be desirable to attach the pollutant trap 120 to the wheel well 208. Accordingly, in some embodiments, the wheel well is configured to essentially be the pollutant trap.

The pollutant trap 120 can be made to any suitable configuration, for example, triangular, elliptical, L-shape, square, rectangular, circular, round, spherical, or any other shape that is designed to fit onto any part of a motorized or non-motorized vehicle. The dimensions of the pollutant trap 120 can vary depending on the particular arrangement and location of the pollutant trap 120, as will be described hereinafter. Preferably, the pollutant trap 120 is constructed such that it snugly fits into the wheel well, fender or on a mud flap of a vehicle 200 and has a shape that is commensurate to the wheel well splash pattern of a particular vehicle 100 and/or has a shape and/or position under the vehicle that is optimal for the collection of pollutants driven into and underneath the vehicle 100 by the vacuum created while driving and/or by to the airflow or vacuum created by a pollutant liberator such as a fan, blower, or vacuum apparatus.

The pollutant trap 120 may also include a fastener for attaching the pollutant trap 120 to the vehicle 100. Any method of attachment may be used to attach the pollutant trap 120 to the vehicle 100, such as Velcro, clips, screws, adhesives, fasteners, brackets, and the like.

In one embodiment the pollutant trap 120 is attached to the underside 209 of a vehicle 200. By providing the pollutant trap 120 on the underside of a vehicle 209, the pollutant trap 120 collects the pollutants that are disturbed or liberated when the vehicle 200 is driven on the roadway 202. In another embodiment, still more embodiments, the wheel housing 124 of a vehicle 100 is designed such that it improves the vacuum under the vehicle 100 or into the wheel well and/or focuses the dispersed pollutants onto the pollutant traps pad 126.

Figure 9:
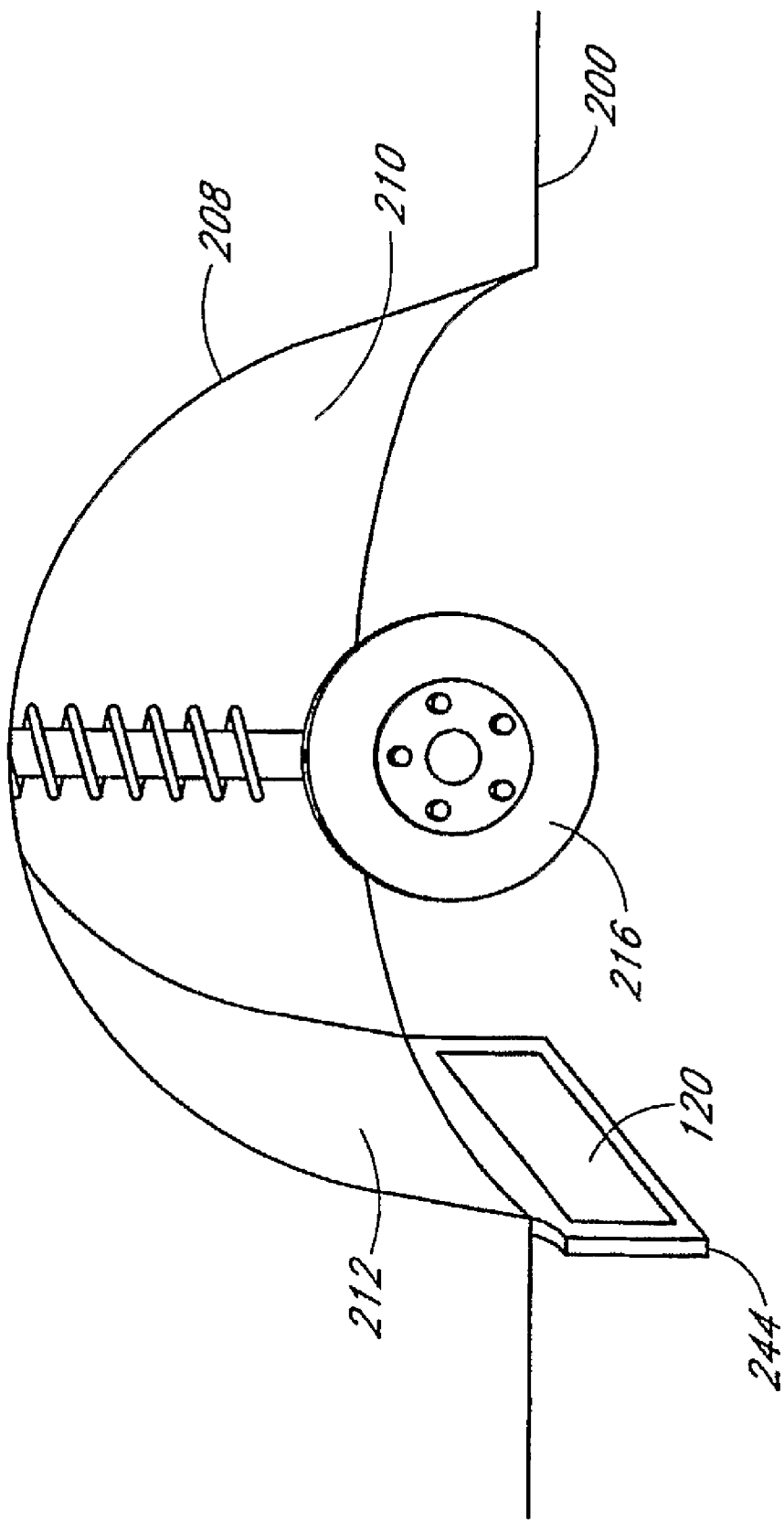
FIG. 9 is a schematic view of the pollutant trap of FIG. 3 used on the mud flap of a vehicle.
Figure 10:
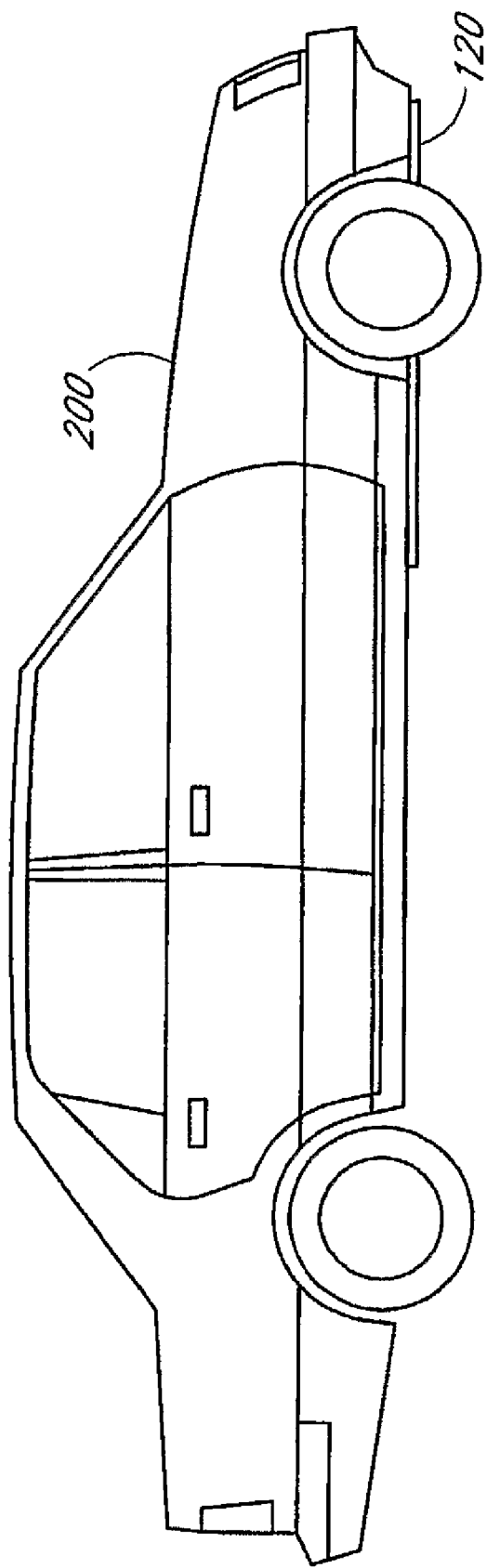
FIG. 10 is a schematic view of the pollutant trap of FIG. 3 used with a vehicle.

As shown FIG. 9, the pollutant trap 120 may also be provided on a mud flap 244 of a vehicle 200. Generally, however, as shown in FIG. 10, the pollutant trap 120 may be provided anywhere on the underside 209 of the vehicle 200, such that the exposed portion of the pollutant trap 120 is facing toward the roadway 202 at a position that collects roadway pollutants as they are liberated from the roadway surface. In some embodiments, the pollutant trap 120 may be provided at the front of the vehicle. In more embodiments, the pollutant trap 120 may be provided at the fender wheel well.

In some embodiments, a pollutant stimulator or liberator (not shown) may be used to increase the air flow near the pollutant trap and/or roadway, thereby increasing the pollutants removed from the roadway and attached to the pollutant trap. In some embodiments, the pollutant stimulator may use forced induction or suction to increase the air flow. Examples of pollutant stimulator include, but are not limited to, blowers, motors, fans and the like.

Figure 11:
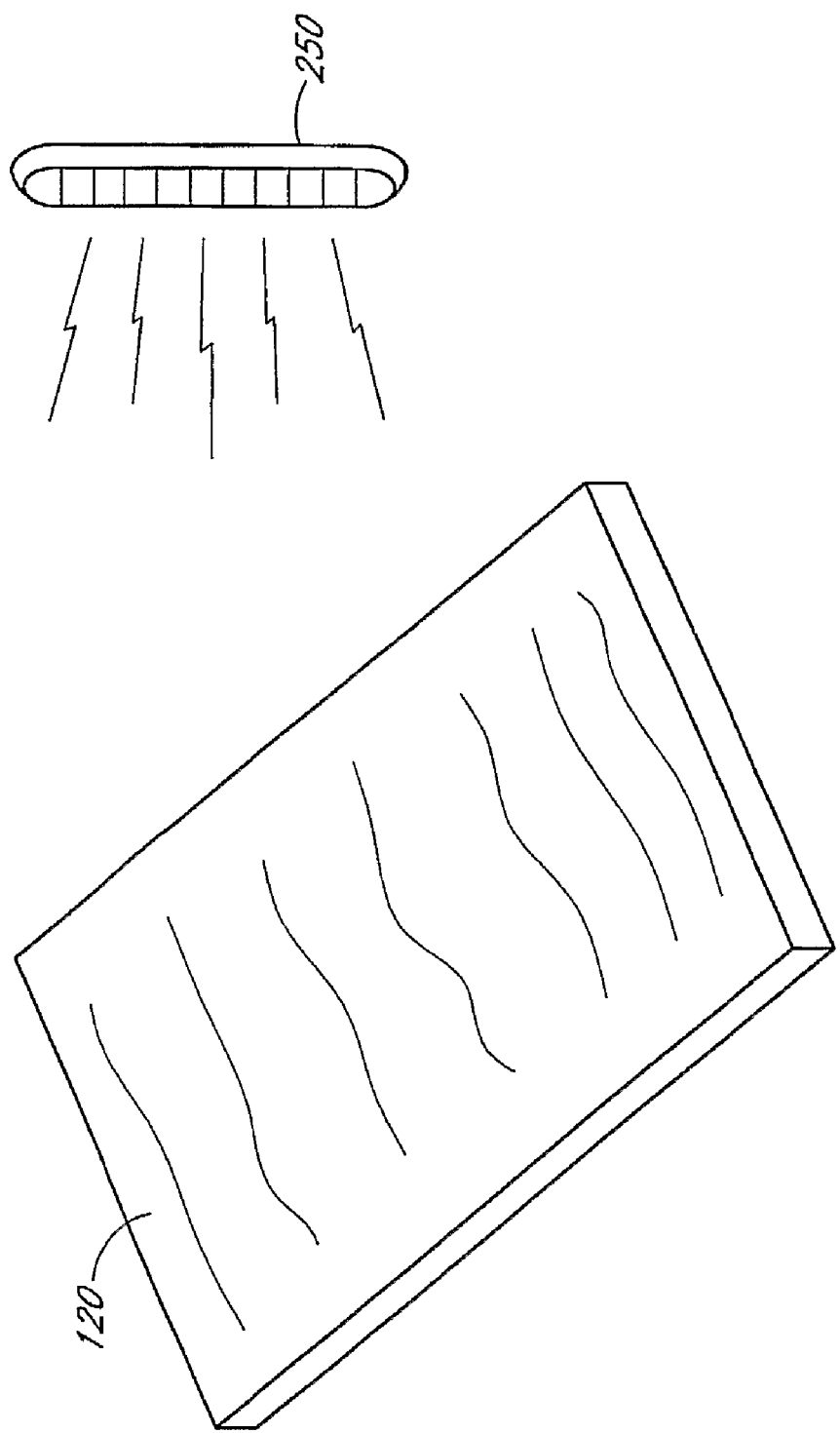
FIG. 11 is a schematic view of the pollutant trap of FIG. 3 exposed to a UV-light source.

In some embodiments, the pollutant trap 120 can be configured to kill bacteria, viruses, and/or other micro-organisms. For example, in one embodiment (not shown) the pollutant trap 120 can include a material that is coated with a liquid which forms a series of microscopic spikes as it dries. The cell membrane of micro-organisms coming into contact with this surface is pierced, resulting in the death of the micro-organism. An example of an anti-microbic liquid which forms said microscopic spikes is Biogreen 3000™, which is available from Microgenix Technologies Limited of Kent, England. FIG. 11 illustrates another embodiment of a pollutant trap 120 that may be used to neutralize microorganisms. As shown in FIG. 11, the pollutant trap 120 can be exposed to an ultra-violet light source 250 to kill and/or neutralize bacteria, viruses, and other organisms present in the pollutant trap 120. In another embodiment, the pollutant trap 120 includes a disinfectant or an anti-biotic substance or material, for example, an antibiotic substance which is coated on the pollutant trap pad 126. In yet another embodiment, the pollutant trap includes a disinfectant or ozonator that kills microorganisms.

The pollution trap 120 contemplated herein may be configured to be disposed on any suitable vehicle surface. For example, in some embodiments the pollutant trap 120 can be permanently fixed to the vehicle 200. In other embodiments, the pollutant trap 120 can be detachably fixed to the vehicle 200. In some embodiments, the housing 224 can be permanently attached to the vehicle 200. In other embodiments, the pollutant trap pad 126 is detachable and/or replaceable. In still more embodiments, the pollutant trap 120 is exposed, while in other embodiments, the pollutant trap 120 is concealed.

Figure 12:
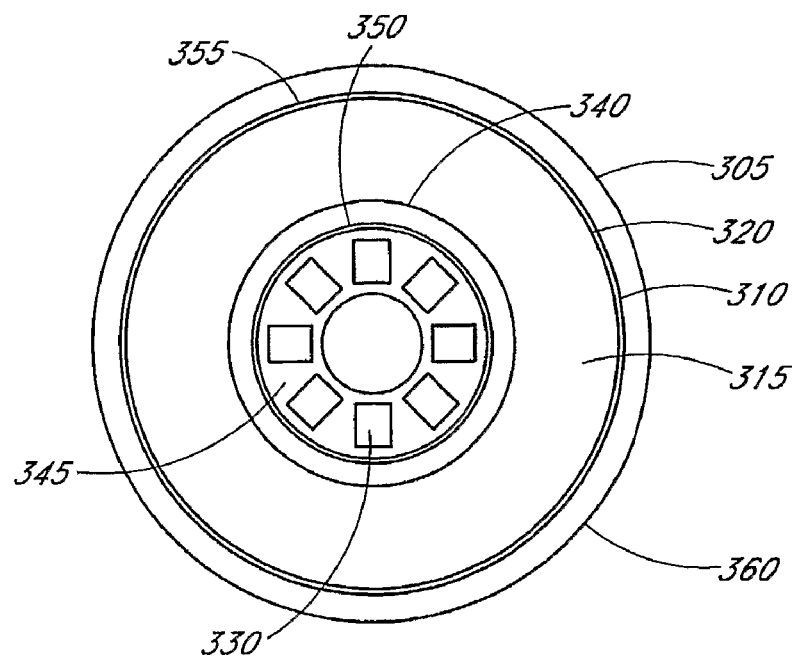
FIG. 12 is a side view of a pollutant trap disposed on brake shield.
Figure 13:
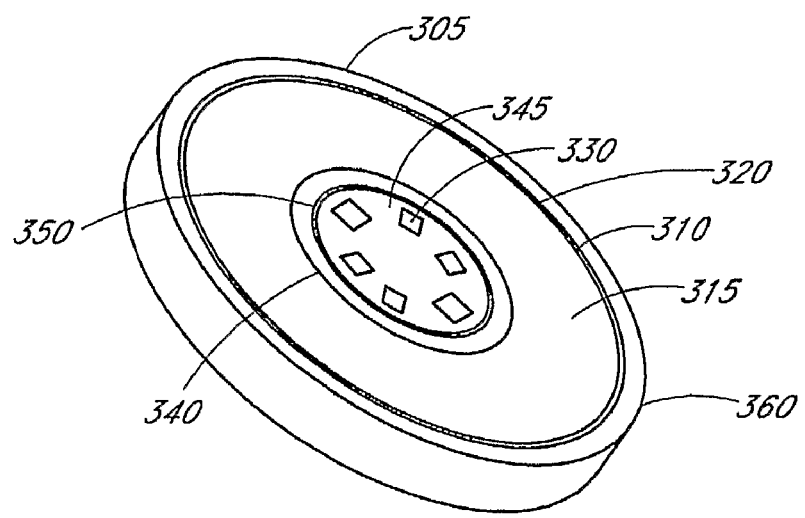
FIG. 13 is a perspective view of a pollutant trap disposed on a brake shield.

Referring now to FIGS. 12-13, in some embodiments, the pollutant trap 310 can be disposed near or on a brake shield 305 to collect pollutants released from a disk brake pad of a vehicle when the disk brake pad engages the disk brake rotor to stop the vehicle. Brake shields are well known in the art, and one such example of a brake shield is described in U.S. Pat. No. 4,484,667, entitled "Shield Plate in Wheel and Disc Brake Assembly" filed Sep. 27, 1982, the entirety of which is incorporated by reference herein. The brake shield 305 can be configured in a variety of ways to suitably fit the numerous types or styles of wheels that are available for automobiles. The example of the brake shield 305 shown in FIGS. 12-13 can be disposed on the inner-side of a wheel of an automobile between a portion of the wheel and a rotor of a disk brake for that wheel. The brake shield 305 can be configured to have a thin annular plate 360 and include an inner conical portion 350. A flat annular surface 345 containing openings 330 for passing the wheel studs can be connected to the inner conical portion 350 of the brake shield 305.

FIGS. 12-13 also illustrate an embodiment of a pollutant trap 310 that can be affixed near the brake shield 305 to capture brake dust generated from the disk brake pad. The pollutant trap 310 can be disposed on or next to an inner-facing surface of the brake shield 305, e.g., the surface that faces the rotor of a disk brake. The pollutant trap 310 can have an annular donut shape with an inner annular portion 340 that fits around the inner conical portion 350 of the brake shield 305 and an outer annular portion 355 that fits inside of the annular plate 360. In some embodiments the pollutant trap 310 can extend to the edge of the annular plate 360. The pollutant trap 310 includes a pollutant trap pad 315 to collect the brake dust and other pollutants. The pollutant trap pad 315 can be removable from the pollutant trap 310 for disposal and replacement. In some embodiments, the pollutant trap 310 shown in FIGS. 12-13 and described above can be integrated with the brake shield 305 such that they are a single unit (e.g., the pollutant trap 310 performs the function of the brake shield and the pollutant trap) to block brake dust from the wheel and capture the brake dust and other pollutants on the pollutant trap pad 315.

Figure 14:
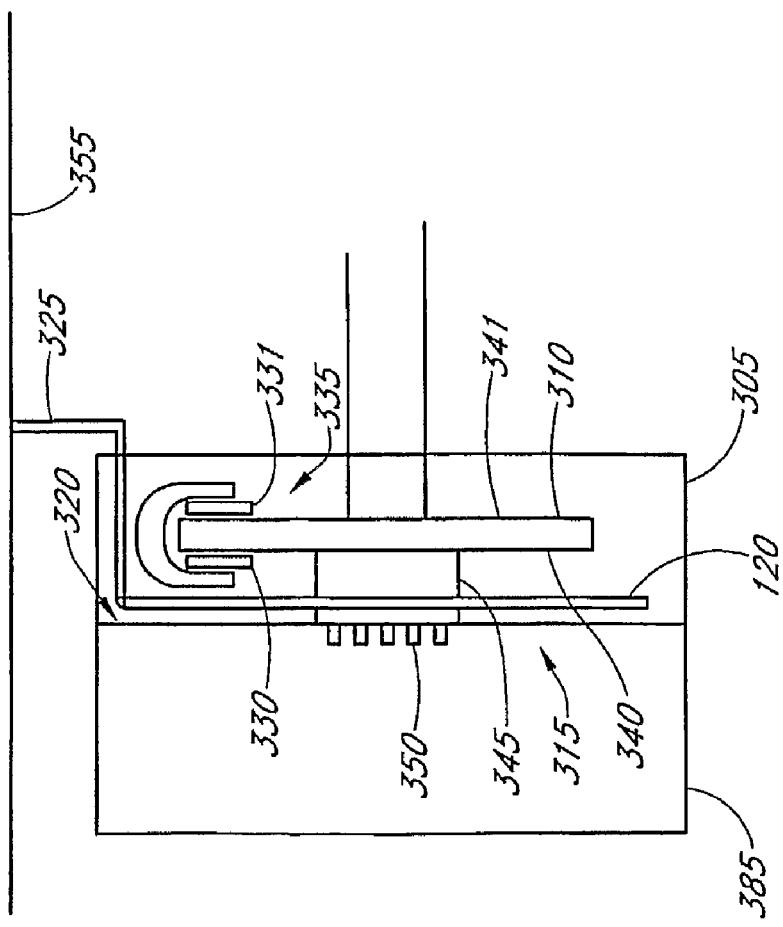
FIG. 14 is a front view of a pollutant trap disposed between a portion of a rim and a portion of a braking surface.

Referring now to FIG. 14, in some embodiments the pollution trap 120 can be disposed near a brake assembly 335. The brake assembly 335 can include a movable braking surface 340, for example, as typically found on a brake rotor 310, and one or more brake pads 330. In this example, the brake assembly 335 includes a brake rotor 310 with two braking surfaces 340, 341 and two disc brake pads 330, 331. The pollution trap 120 can also be used to capture pollutants from other embodiments of brake assemblies, for example, a typical drum brake assembly (not shown) that includes drum brake shoes and a brake drum with a braking surface. In some embodiments, the brake assembly can have one braking surface or two or more braking surfaces, and can also have one brake pad or two or more brake pads. The pollution trap 120 can be positioned such that it is exposed to a pollutant so that it can capture at least a portion of the pollutant for example, brake dust, generated from placing the brake pad 330 in contact with the braking surface 340 while the braking surface 340 is in motion. The pollutant generated can include, for example, particles from the brake pad 330 or from the braking surface 340 that are freed as a result of friction between brake pad 330 and the braking surface 340 during braking.

Figure 15:
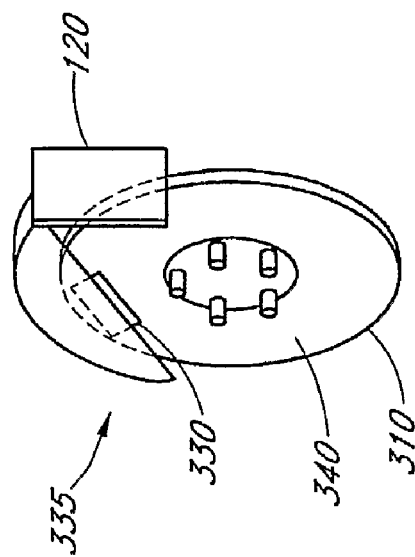
FIG. 15 is a perspective view of a pollutant trap disposed on a brake assembly.

Referring to FIG. 15, in some embodiments for positioning the pollution trap 120 near the brake assembly 335, the pollution trap 120 can be connected to the brake assembly 335 using a fastener, such as a bolt, to hold the pollution trap 120 in a suitable position to collect pollutants. In other embodiments, the pollution trap 120 can be connected to the vehicle, connected to a member that is connected to the vehicle, connected to the wheel, or connected to a structure on the underside of the vehicle or the underside of the vehicle itself. Determining the optimal place for connecting the pollution trap 120 to the vehicle can be at least partially dependent on the configuration of the vehicle itself. As stated above, in some embodiments, the pollutants present in the airflow generated by the rotation of the tires, especially after application of the brakes, can be indirectly transferred to a filter material placed anywhere on the vehicle. In some embodiments, for example, a hose is positioned to collect brake dust that is liberated from the brake assembly (e.g., a hose connected to the brake assembly itself or a cover that houses the brake assembly) and the airflow containing the brake dust is transferred to a filter material that is housed at a position distal to the brake assembly. The embodiments disclosed herein are examples of places to connect the pollution trap to the vehicle, but these examples are not meant to limit the invention to only those places specifically disclosed.

In some embodiments, the pollutant trap 120 is positioned proximal to the brake assembly 335, e.g., in close enough relation such that collection of brake dust by the pollution trap 120 is possible. Embodiments are contemplated where the pollution trap 120 can be positioned at a variety of locations relative to the brake assembly 335. For example, the pollution trap 120 can be positioned proximal to the braking point of contact, for example, the point of contact of the brake pad, e.g., brake pad 330, and a braking surface, e.g., the braking surface 340, and in any direction relative to the braking point of contact, such that the pollution trap pad can collect at least some of the brake dust generated from braking. For example, the pollutant trap 120 can be positioned at or about the following distances from the braking point of contact, e.g., less than 5 millimeters, equal to or between (in millimeters) 5-10, 10-15, 15-20, 20-25, 25-30, 30-35, 35-40, 40-45, 45-50, 50-55, 55-60, 60-65, 70-75, 75-80, 80-85, 85-90, 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, 195-200, 200-205, 205-210, 210-215, 215-220, 220-225, 225-230, 230-235, 235-240, 240-245, 245-250, 250-255, 255-260, 260-265, 265-270, 270-275, 275-280, 280-285, 285-290, 290-295, 295-300, 300-305, 305-310, 310-315, 315-320, 320-325, 325-330, 330-335, 335-340, 340-345, 345-350, 350-355, 355-360, 360-365, 365-370, 370-375, 375-380, 380-385, 385-390, 390-395, 395-400, 400-405, 405-410, 410-415, 415-420, 420-425, 425-430, 430-435, 435-440, 440-445, 445-450, 450-455, 455-460, 460-465, 465-470, 470-475, 475-480, 480-485, 485-490, 490-495, 495-500, 500-505, 505-510, 510-515, 515-520, 520-525, 525-530, 530-535, 535-540, 540-545, 545-550, 550-555, 555-560, 560-565, 565-570, 570-575, 575-580, 580-585, 585-590, 590-595, 595-600, 600-605, 605-610, 610-615, 615-620, 620-625, 625-630, 630-635, 635-640, 640-645, 645-650, 650-655, 655-660, 660-665, 665-670, 670-675, 675-680, 680-685, 685-690, 690-695, 695-700, 700-705, 705-710, 710-715, 715-720, 720-725, 725-730, 730-735, 735-740, 740-745, 745-750, 750-755, 755-760, 760-765, 765-770, 770-775, 775-780, 780-785, 785-790, 790-795, 795-800, 800-805, 805-810, 810-815, 815-820, 820-825, 825-830, 830-835, 835-840, 840-845, 845-850, 850-855, 855-860, 860-865, 865-870, 870-875, 875-880, 880-885, 885-890, 890-895, 895-900, 900-905, 905-910, 910-915, 915-920, 920-925, 925-930, 930-935, 935-940, 940-945, 945-950, 950-955, 955-960, 960-965, 965-970, 970-975, 975-980, 980-985, 985-990, 990-995, and 995-1000 millimeters, and greater than 1000 millimeters.

Referring again to FIG. 14, in some embodiments, a rim or wheel 385 is connected to the brake surface 340, via a member 345 and held in place using wheel studs 350, and the rim 385 rotates when the brake surface 340 rotates and slows when the brake pad 330 is placed in contact with the braking surface 340. This embodiment can be suitable for use on a vehicle with any number of wheels that use brakes that generate pollutants while braking the vehicle. The rim 385 can have an inner portion 320 generally facing towards at least a portion of the braking surface 340 and an outer portion 315 generally facing away from the braking surface 340. The pollutant trap 120 can be positioned between the inner potion 320 of the rim 385 and at least a portion of the braking surface 340 such that the pollution trap is exposed to pollutants (e.g., brake dust) and also shield the rim 385 from pollutants. In some embodiments the pollution trap 120 is not connected to the rim 385. In other embodiments, the pollution trap 120 can be connected to the rim 385. For example, in some embodiments, the pollution trap 120 can be configured to snap onto the rim (not shown).

In one embodiment, the pollution trap 120 can be connected to portion of a member 325 which holds the pollutant trap 120 near the brake assembly 335 such that the pollution trap 120 is exposed to pollutants but neither the member 325 or the pollution trap 120 interfere with the movement of the rim 385, the braking surface 340, or the operation of the brake assembly. In some embodiments where the pollution trap 120 is connected to the member 325, the pollution trap can remain generally stationary, for example, it does not rotate with the rotation of the brake surface 340 or the rim 385. A portion of the member 325 can also be connected to an object near the rim 385, for example, a surface or structure of a vehicle, for example, the surface of vehicle wheel well 355. In the embodiments for a pollution trap 120 described herein, the pollution trap 120 can be configured to contain multiple pollution trap pads such that the removal of a first pollution trap pad exposes a second pollution trap pad to a pollutant generated from braking.

Embodiments of a pollution trap and the methods of reducing pollutants on the roadway surface, as generally described herein, are not limited to four-wheeled vehicles, and are not limited to motorized vehicles. Pollution traps can be suitably designed for use on numerous types of vehicles, including two wheeled vehicles (e.g., motorcycles, bicycles, scooters, mopeds, Human Segway Transporters), three wheeled vehicles (e.g., motorized tricycles and ATV's, and non-motorized tricycles), four wheeled vehicles (e.g., ATV's, tractors, cars, trucks, vans, etc.), and other larger vehicles with more than four wheels (e.g., multi-wheeled trucks, etc.). A vehicle can be configured to include one or more pollution traps. The pollution traps can be disposed anywhere on the vehicles where the pollutant trap pad 126 can be exposed to roadway pollutants. For example, the pollution trap can be positioned in numerous places on a vehicle including, but is not limited to, fenders, front spoilers, rear spoilers, splash guards, mud flaps, wheel wells, the underside of the vehicle, or any other suitable location on the vehicle where the pollutant trap can be exposed to roadway pollutants. Additionally, pollutant traps can be placed in on any type of vehicle in locations where the pollutant trap pad 126 is not normally exposed to roadway pollutants but becomes exposed to the roadway pollutants through the use of a fan or a blower, a vacuum, or any air flow through and around the vehicle, designed or naturally occurring, or any type of device that carries the roadway pollutants to the pollutant trap pad 126.

A pollutant trap can be designed in numerous ways. In one embodiment, the pollutant trap 120 can include a single pollutant trap pad 126. In another other embodiment (not shown), the pollutant trap 120 can include multiple pollutant trap pads disposed on a roll, where one pollutant trap pad is exposed to the roadway and, after a period of time, the exposed pollutant trap pad is removed from the roll thereby exposing another pollutant trap pad which can be used to collect roadway pollutants.

In another embodiment (not shown), the pollution trap 120 can include multiple pollutant trap pads generally configured in a stack, similar to, for example, a tissue box or a napkin dispenser, with one pollutant trap pad 126 exposed to the roadway pollutants. After a period of time, the exposed pollutant trap pad 126 is removed from the pollutant trap 120 thereby exposing to the environment another pollutant trap pad 126, which is then used to collect roadway pollutants.

In yet another embodiment, the pollution trap 120 can include an indicator that shows when the pollutant trap 120 or the pollutant trap pad 126 should be serviced, for example, when the pollution trap 120 should be changed or when the pollutant trap pad 126 should be changed. In embodiments that use multiple pollutant trap pads 126, (e.g., a roll of pollutant trap pads 126 or a stack of pollutant trap pads 126), the pollutant trap 120 can include an indicator that shows when to remove the exposed pollutant trap pad 126 so that another pollutant trap pad 126 can be exposed to the environment. The aforementioned indicator can be incorporated in various ways. For example, in one embodiment the indicator is disposed on the pollutant trap frame. In another embodiment, the indicator is a chemical on the pollutant trap pad that visibly changes color to indicate when the pollutant trap pad 126 should be changed. In another embodiment, the indicator is a sensor or a sensing system that can be separate from the pollutant trap 126 or the pollutant trap and provides a signal that indicates when the pollutant trap 120 or the pollutant trap pad 126 should be serviced or changed. While the numerous materials disclosed herein are examples of suitable materials that can be used in a pollutant trap, the invention is not limited to said disclosed materials.

In another embodiment, the same material used to form a pollution trap pad can also be used in the manufacture of gloves, wipes, sponges and cloths that are used for collecting brake dust. Preferably, the material can have brake dust adherence properties. In some embodiments the material can have hydrocarbon binding properties. For example, the material can be formed into a glove which covers at least a portion of the hand. The gloves, wipes, cloths and sponges can be used by, for example, detailers, dealers and consumers, to remove accumulated brake dust and then be disposed of properly. The brake dust adherence properties of the gloves, wipes, cloths and sponges made from the material that is used to form a pollution trap pad allows the dust to be collected and disposed of in an environmentally safe manner. Various sizes and shapes of gloves, cloths, wipes and sponges are contemplated for removing brake dust. For example, the wipes, cloths and sponges may be configured as sheets, e.g., substantially flat and thin with generally parallel sides. In some embodiments, the wipes and sponges may also comprise a cleaning solution that helps to separate the brake dust from the wheel or brake part it has collected on. In some embodiments, the wipes are formed into a stack and dispensed to a user one at a time, where removing one wipe allows access to the underlying wipe.

The pollutant trap collects pollutants that are exposed to the pollution trap pad by, for example, the air flow in and around a wheel well, or the disbursal of the pollutants from a polluting device, e.g., brake dust from the brake assembly. In some circumstances, roadway pollutants can be liberated from the road by the impact of a vehicles tires on the pollutant, and the tires can lift and throw the pollutant into a wheel well, and onto a pollution trap if disposed in the wheel well. Vehicles and devices on vehicles may not be currently designed to focus air flow to a pollution trap positioned on a vehicle, for example, in the wheel well. Certain design considerations of a vehicle and devices included on the vehicle can enhance the ability of the pollutant trap to collect pollutants by enhancing or focusing the flow of air to the pollutant trap or by directing the flow of pollutants to the pollutant trap. For example, the wheel wells, wheels, brake assemblies, brake shields, and/or mud flaps can all be designed to enhance the effectiveness of the collection of pollutants on the pollution trap. Also, in certain applications, one design of a pollution trap may work better than another pollution trap design. For example in certain applications, a pollution trap may work better with either a flow-through filter or a solid filter or membrane. In other applications, the effectiveness of the pollutant trap can be increased by including include louvers, fans or other systems or devices that increase the amount of pollutants exposed to the pollution trap pad. One or more of the components that may affect the flow of air or the disbursement of pollutants can be designed to increase the amount of the pollutants the pollution trap collects through testing each various device design and measuring the amount of pollutants that are collected with each design. For some applications, the coordinated design of several components (e.g., wheel wells and brake assemblies) can increase the effectiveness of the pollutant trap.

By one approach, for example, a first design of a pollutant trap comprising a pollution trap pad is mounted in the wheel well of an automobile and the automobile is placed on a testing apparatus that allows for the wheel of the vehicle to be suspended (e.g., a auto-lift, as commonly used in the automotive industry). The automobile is turned on, the transmission is engaged, the wheels are induced to revolve at a specific speed or revolution/minute, and the airflow to the pad is monitored by a conventional airflow detector (e.g., colored smoke or a chemical aerosol is blown into the wheel and amount of smoke or chemical directed to the pad is monitored by video, time-lapse photography, or a smoke or chemical detector placed on the pad itself). Preferably, the airflow to the pad is monitored at several speeds or revolutions/minute of the wheels and optionally, the brakes can be applied so as to generate brake dust and the spray pattern of brake dust given the speed or revolutions/minute of the wheel and particular design is monitored. Once the data for the first design of wheel well comprising a first design of pollutant trap such as airflow to the pad, amount of aerosol pollutant or brake dust collected on the pad has been obtained and, preferably, recorded, a second design of pollutant trap and/or a second design of wheel well is tested in the same manner. The second design wheel well can differ from the first by having louvers or air flow modulators or air flow directors that enhance or direct the airflow generated by the revolution of the wheel (e.g., natural airflow generated by movement of the tire) or enhance or direct the airflow generated by a fan or blower (e.g., artificially-induced airflow) to the pad, for example. Similarly, the second design of a pollutant trap comprising the pollution trap pad can differ from the first by having a shape or attribute that enhances or directs the airflow or pollutants to the pad, such as louvers or air flow modulators or air flow directors. Again, the data is collected, preferably recorded, and is compared to the data for the first design. Though the comparison of data, design features that facilitate airflow and/or pollutant collection at the pad are identified and a basis for a third design of wheel well and/or pollutant trap is determined. The process steps of designing a wheel well feature that facilitates airflow or pollutant capture at the pad, separately or in conjunction with the design of a pollutant trap and/or pad feature, analyzing the airflow behavior at or near the wheel well, brake assembly, or pollutant trap pad and selecting a new design of wheel well or feature thereof or pollutant trap, pollutant trap pad, or feature thereof is also an embodiment of the invention. Accordingly, some embodiments encompass methods of identifying a design of a wheel well and/or a pollutant trap assembly comprising a pollution trap pad, whereby a first design of wheel well is selected, a first design of pollutant trap is selected, and the direction, amount, or force of airflow to the pollution trap pad or the amount of pollution collected on the pad is monitored or is compared to the direction, amount, or force of airflow to the pollution trap pad or the amount of pollution collected on the pad of a second design of a wheel well and/or a pollutant trap assembly comprising a pollution trap pad such that a difference in the direction, amount, or force of airflow to the pollution trap pad or the amount of pollution collected on the pads of the two wheel well and/or pollution trap pad designs are observed. By following these methods, more efficient pollution traps and/or wheel well assemblies are developed.

Figure 16:
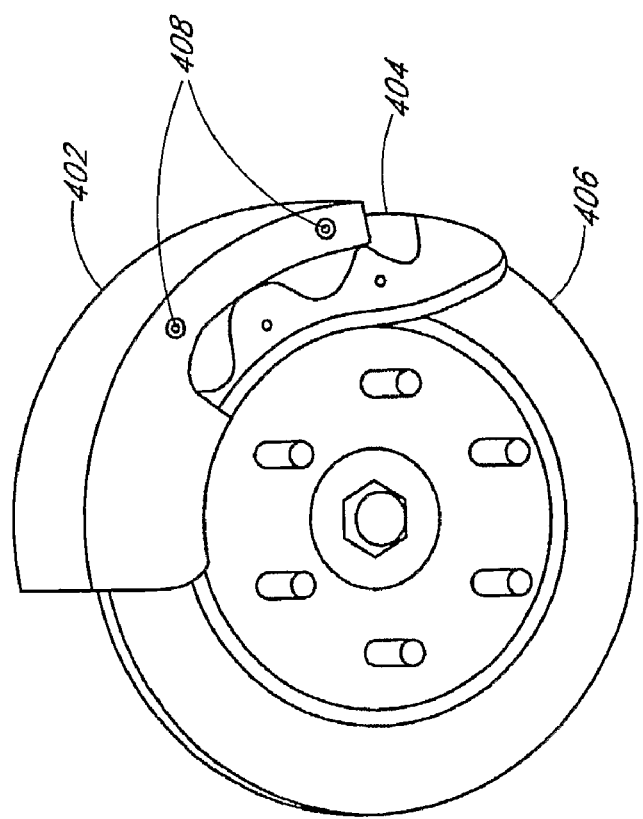
FIG. 16 is a perspective view of a dust collector housing disposed on a brake assembly.

FIG. 16 illustrates one embodiment of a system for collecting brake dust from a brake assembly of a vehicle. A housing 402 is disposed on a disc-brake assembly 404 of a vehicle so that at least a portion of the brake assembly 404 is covered by the housing 402. The brake assembly 404 can include brake calibers (e.g., brake calibers 478 in FIG. 22). and a rotatable brake rotor 406. The housing 402 collects dust that is generated during braking, e.g., from the contact of a brake pad (not shown) of the brake assembly 404 and the moving brake rotor 406 while the brake assembly 404 is engaged to brake the vehicle. The housing 404 can be made from a variety of materials that are able to withstand the high temperatures generated during braking, for example, metal, fiberglass, or a suitable high-temperature resistant plastic.

Fasteners 408 (e.g., bolts, screws, rivets, connection pins) securely couple the housing 402 to the brake assembly 404, according to this embodiment. In some embodiments, the housing 402 is connected to another suitable part of the vehicle, e.g., a dust shield, or a supporting member coupled to the vehicle body, so that the housing 402 is located close proximity to the brake assembly 404.

The rotation of the brake rotor 406 while the vehicle is in motion generates an air flow that moves the brake dust generated at the point of contact between the brake pad and the rotor 406 to the housing 402, where the brake dust is collected by a filter (not shown in FIG. 16), according to one embodiment. The air flow generated by the rotation of the rotors, and especially by rotors that include fins, can be significant. The rotor rotation causes a strong air flow to be generated in a radial direction which helps to cool the brake parts and provides an air flow that can be advantageously utilized to control the brake dust, as described in the various embodiments herein. In another embodiment, the brake dust in the housing is moved to another location on the vehicle outside of the housing 402 and collected in a filter or a dust collector (not shown in FIG. 16). These embodiments are discussed in more detail below.

Figure 17:
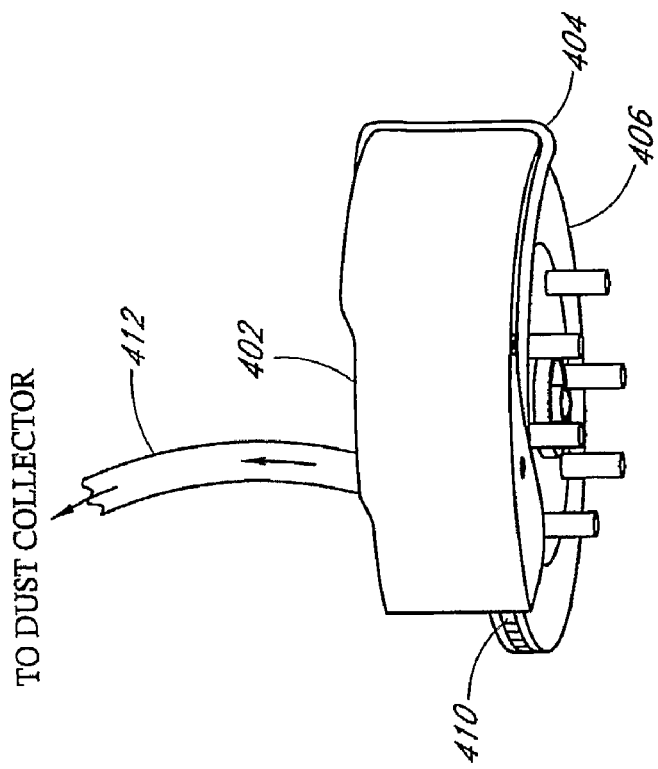
FIG. 17 is top view of a dust collector housing that includes a hose to carry brake dust to a filter located externally to the housing.

FIG. 17 is top view of a housing 402 that includes a conduit structure to carry brake dust away from the housing 402. In this embodiment, the conduit is a flexible conduit e.g., a hose 412. The hose 412 is coupled to the housing 402 with a fitting member (e.g., shown in FIG. 18) that carries brake dust to a filter or a dust collector 450 (shown in FIG. 18) located external to the housing 402. In some embodiments, a flexible hose can be used which can allow for some movement of the housing 402/brake assembly 404 during normal operation of the vehicle. In some embodiments, a non-flexible conduit can be used, for example, in configurations where there is no relative movement between the housing 402 and the external dust collector. In some embodiments, the housing 402 can be configured with channels (not shown) that guide the dust collected within the housing 402 to the fitting member and out to the hose 412. As shown in FIG. 17, typically a brake rotor 406 has fins 410 disposed between the inside and outside braking surfaces of the rotor. The fins 410 generate an air flow, during rotation of the rotor 406, which carries at least a portion of the brake dust to the housing 402.

Figure 18:
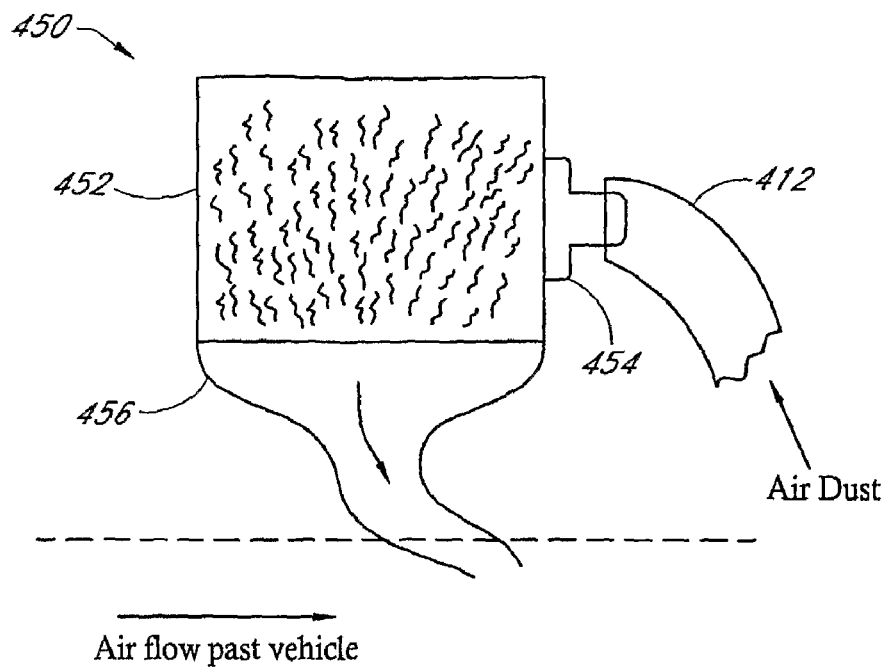
FIG. 18 is schematic view of a brake dust collector.
Figure 19:
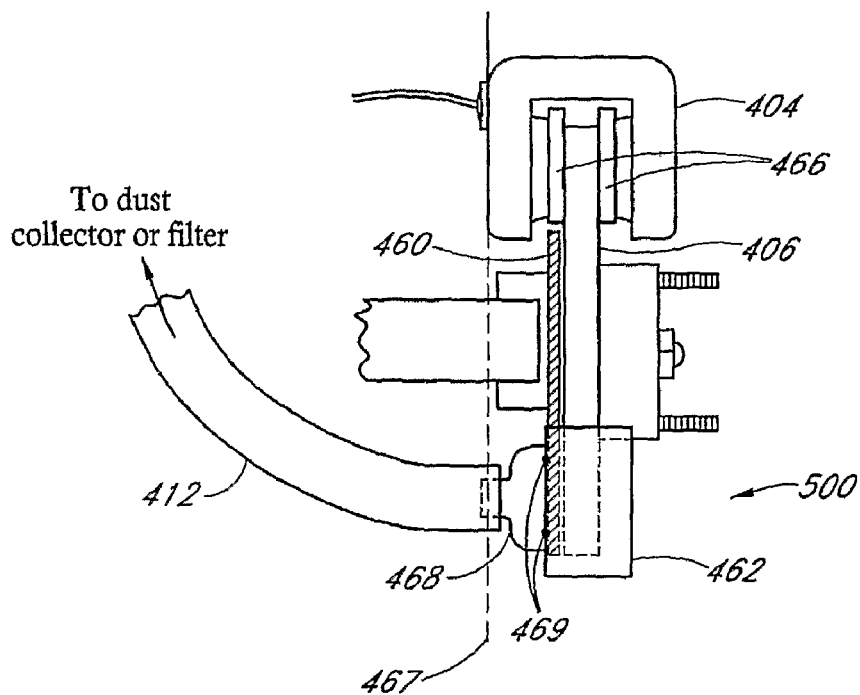
FIG. 19 is a schematic of a rotor shroud for collecting brake dust.

FIG. 18 is a schematic view of a brake dust collector 450 that is external to the housing 406. The collector 450 can be placed anywhere on the vehicle, including on the vehicle underbody, in the trunk, in the engine compartment, in the wheel well, or any other suitable location. In some embodiments, the collector 450 can be located in an accessible place on the vehicle to facilitate emptying dust that is captured in the collector 450. As shown in FIG. 19, the dust collector includes a hose fitting 454 attached to a body 452. The hose 412 that carries dust from the housing 406 is coupled to the dust collector 450 at the fitting 454. The dust collector 450 also includes an air exhaust 456. An air flow carrying brake dust enters the dust collector 450 via the hose 412 and the fitting 454. The dust collector 450 separates the dust from the air flowing through the dust collector 450 using, for example, a filter (e.g., a disposable filter or a cleanable filter), and the air flow continues out the air exhaust 456. In other embodiments, the brake dust is separated from the air flow and collected in the dust collector body 452, which can be periodically emptied. In one embodiment, the air exhaust is configured to use the air flow past, through or under the vehicle to create suction via the venturi effect. The suction creates an air flow from the housing 402, through the hose 412, and the dust collector 450, and carries the brake dust from the housing 402 to the collector 450. As the speed of the vehicle increase, the air flow created by the venturi effect also increases. In other embodiments, the air flow from the housing 402 to the collector 450 can be created by an electrical or mechanical pump or fan.

FIG. 19 is a schematic of another embodiment of a brake dust collector 500. FIG. 19 shows a brake assembly 404 that includes brake pads 466 that contact a movable rotor 406 during braking. A rotor shroud 462 for collecting brake dust is located so that it covers at least a portion of the rotor 406 after the rotor 406 passes through the brake assembly 404 as the rotor 406 rotates during forward motion of the vehicle. When the vehicle brakes, brake dust is released from the brake pads 466 and the rotor 406 into the rotor shroud 462. The rotor shroud 462 can be formed from a number of suitable materials, e.g., metal, fiberglass, ceramic, or a heat-resistant plastic.

The rotor shroud 462 is attached to a dust shield 460 by fasteners 469, according to this embodiment. In some embodiments, the dust shield 460 is positioned closer to the vehicle interior (shown by dashed line 467), and a portion of the rotor shroud can be correspondingly enlarged to attach to the dust shield at this location 467. This can also be appropriate for the other embodiments disclosed herein. In other embodiments, the rotor shroud 462 can be connected to the brake assembly 404, to the vehicle, or to another part of an axle or wheel assembly on the vehicle so that the rotor shroud 462 maintains its relative position to the brake assembly 404. In some embodiments (not shown), the rotor shroud 462 includes a brake dust collector (e.g., a filter) positioned below a vented cover so that air carrying brake dust passes through the rotor shroud 462 and out the vented cover, and the brake dust is captured on the filter. According to the embodiment, shown in FIG. 19, the brake dust collector 500 also includes a flexible hose 412 connected to a fitting 468. The fitting 468 is connected to the dust shield 460 on the side of the dust shield 460 opposite the rotor shroud 462. An opening (not shown) in the dust shield 460 is aligned to the fitting 468 and provides a path for brake dust to travel from the rotor shroud 462 to the hose 412, and to an externally located filter or dust collector (e.g., the dust collector 450 shown in FIG. 18). In one embodiment, the airflow in the tube 412 that carries the brake dust away from the rotor shroud 462 is created by the venturi effect, as generally described above. In other embodiments, the air flow from the rotor shroud 462 to the dust collector can be created by an electrical or mechanical pump or fan.

Figure 20:
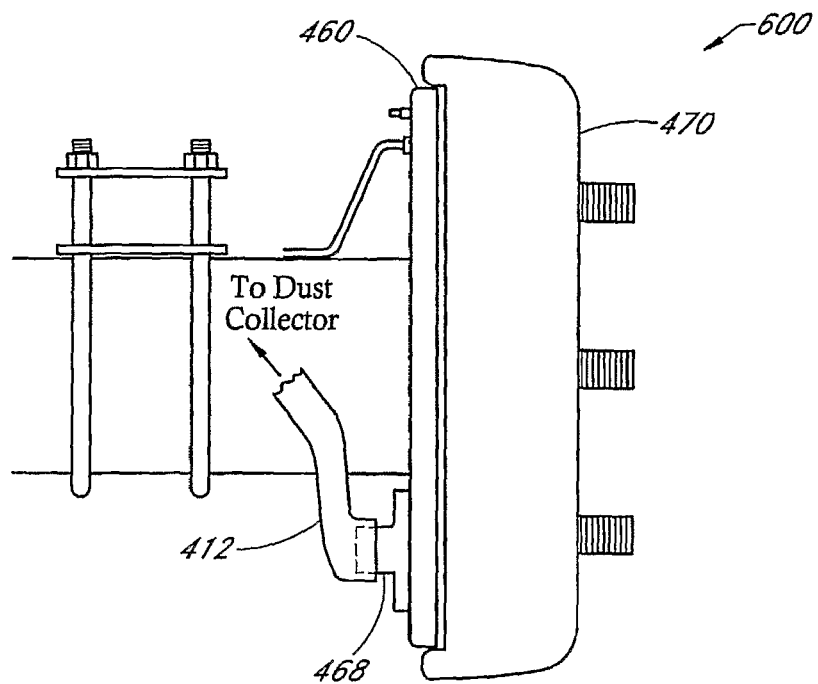
FIG. 20 is a schematic of a brake dust collection system for drum brakes.

FIG. 20 is a schematic of a brake dust collection system 600 for a vehicle equipped with drum brakes. In a drum brake system, the brake pads are located interior to the brake drum 470 and contact an inner surface of the rotating brake drum 470 to stop the vehicle. This embodiment utilizes the generally enclosed configuration of the brake drum as a structure to collect the brake dust. A dust shield 460 located on the open side of the brake drum 470 includes a hose fitting 468 for attaching a flexible hose 412. A hole (not shown) in the dust shield 460 aligned with the fitting 468 allows brake dust to pass from the brake drum 470 through the dust shield 460, through the fitting 468 and out through the hose 412 to a dust collector, e.g., the dust collector 450 shown in FIG. 18 or to a filter. In one embodiment, the airflow in the tube 412 that carries the brake dust away from the brake drum 470 is created by the venturi effect, as generally described above.

Figure 21:
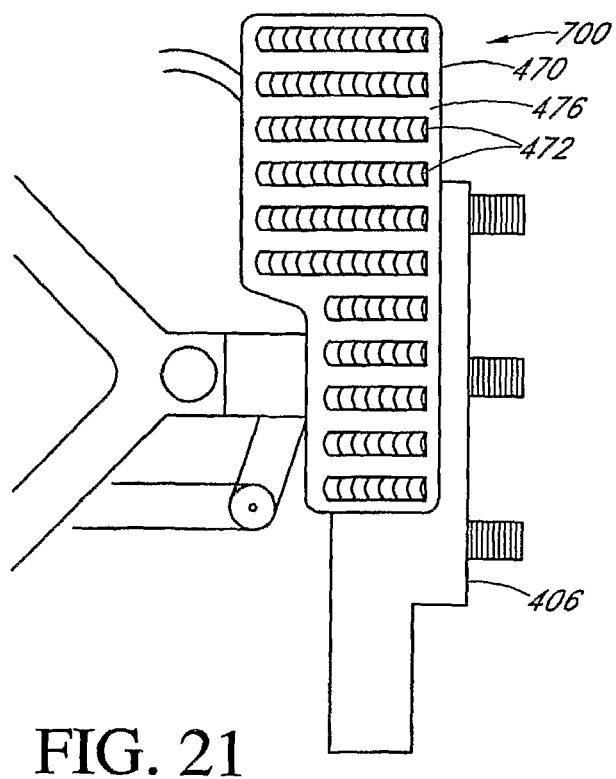
FIG. 21 is a top view of a vented housing that includes a brake dust filter.
Figure 22:
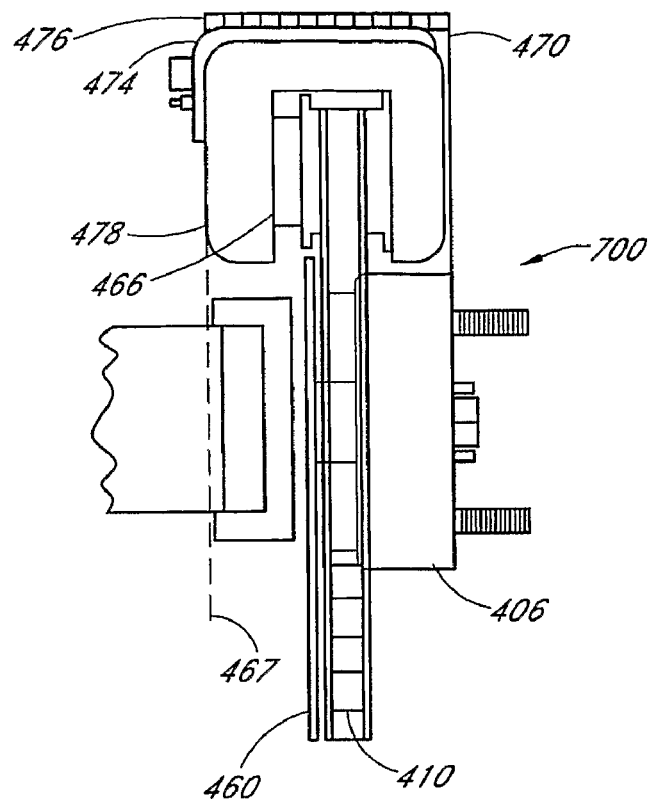
FIG. 22 is a front view of the vented housing of FIG. 21.
Figure 23:
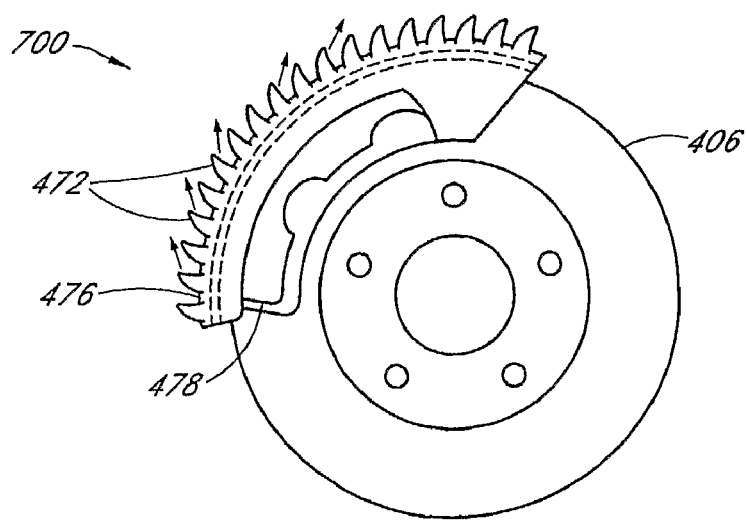
FIG. 23 is a side view of the vented housing of FIG. 21.

FIGS. 21-23 show another embodiment of a dust collector 700 for a vehicle braking system that includes a housing 470 having a filter 474. FIG. 21 is a top view of the brake dust collector 700. As shown in FIG. 21, a housing 470 is positioned over a disc brake assembly (not shown) and a rotor 406. The housing 470 is positioned to collect brake dust generated by the brake assembly, and can be positioned, to cover at least a portion of the brake assembly, for example, the housing 470 can be placed in a similar position as the previous discussed housing 402 shown in FIG. 16.

FIG. 22 is a front view of the dust collector 700 shown in FIG. 21 and shows the positioning of the filter 474 in the housing 470, which is attached to the brake assembly 478, according to one embodiment. In some embodiments, the dust shield 460 is positioned closer to the vehicle interior (shown by dashed line 467), and a portion of the housing 470 can be attached to the dust shield at this location. The cover 476 (FIG. 22) of the housing 470 includes a plurality of vents 472. The filter 474 is positioned between the cover 476 and the brake assembly 478 (FIG. 22). Brake dust released from brake pads 466 and the rotor 406 is captured by the filter 474. The air flow that carries the brake dust to the filter 474 is at least partially created by fins 410 of the rotor 406 during the rotation of the rotor 406 during the forward motion of the vehicle. FIG. 23 is a side view the embodiment of the dust collector shown in FIGS. 21-22. FIG. 23 shows a side ghost view of the filter 474, which is positioned in this embodiment under the vented caliper cover 476 so that the filter 474 is between the cover 476 and the brake assembly 478.

The filter 474 can be either disposable or reusable. In some embodiments, the filter 474 is enclosed within the housing 470, and the housing 470 is configured to be removable to replace or clean the filter 474. In some embodiments, the cover 476 is partially or completely removable to provide easy access to the filter 474 for changing or cleaning. In some embodiments, the filter 474 and cover 476 are configured as an integrated part that is either disposable or cleanable. The filter 474 can be made from a variety of suitable material, including such material as described herein, e.g., a membrane, sponge or a filter, that collects asbestos, hydrocarbons and/or metals, or materials such as described hereinabove for the pollution trap pad.

In embodiments of the rotor shroud (e.g., rotor shroud 462 FIG. 19) and housing (e.g., FIGS. 16, 17, and 21-23) described herein, the shroud or the housing can be connected to a suitably positioned dust shield to hold the shroud and housing in a position to collect the brake dust. In some embodiments, the dust shield and the shroud or housing can be formed as one integrated part with the dust shield. The integrated part can be removable to service (e.g., clean or replace) a filter contained therein, or to clean the collection system.

Figure 24:
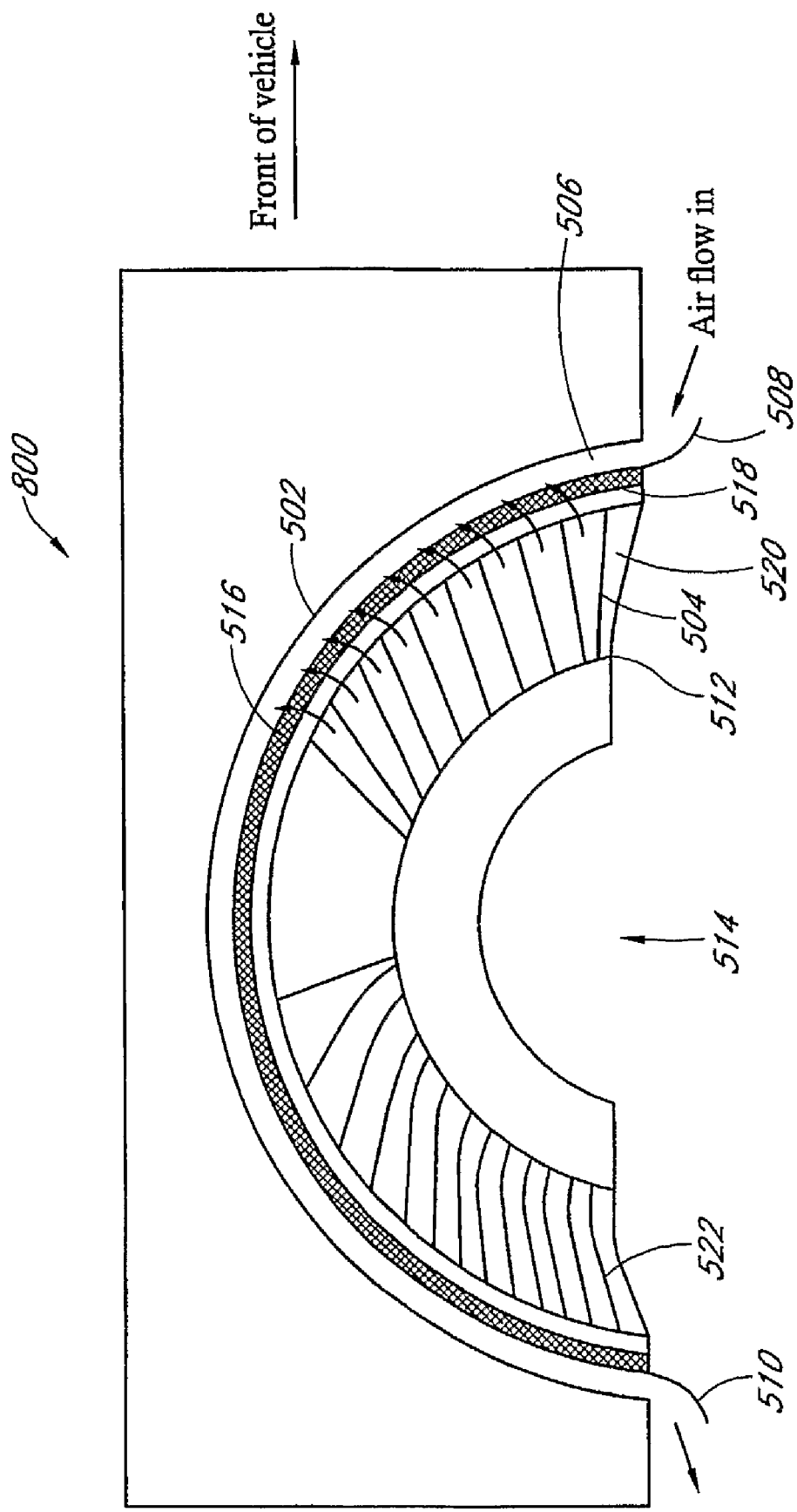
FIG. 24 is a schematic of a vented wheel well that includes a filter element.

FIG. 24 is a schematic of an embodiment of a brake dust collector 800 incorporated into the wheel well of a vehicle, where the dust collector is not dependant on the type of brakes (e.g., disc or drum) that are used on the vehicle. The brake dust collector 800 includes a wheel well 512 that includes a plurality of vents 504 in a wheel well structure 518 that is exposed to the wheel well opening 514. The vents 504 cover at least a portion of the wheel well structure 518. In some embodiments, the vents 504 are disposed on the front 520 of the wheel well structure 518 (e.g., on the wheel well surface towards the front of the vehicle) and the back 522 of the wheel well structure 518 (e.g., on the wheel well surface towards the back of the vehicle). In other embodiments, the vents can be disposed on either the front 520 or the back 522 of the wheel well structure 518.

The wheel well 512 also includes a filter element 516 positioned along the wheel well structure 518 so that the wheel well structure 518 is between the filter 516 and the wheel well opening 514. The filter 516 can cover a portion of the wheel well structure 518 or the entire wheel well structure 518. The filter 516 is fabricated to collect brake dust and/or other roadway pollutants, and can be made from a variety of materials, including such material as described herein, e.g., a membrane, sponge or a filter, that collects asbestos, hydrocarbons and/or metals, including those described herein for the pollution trap pad and the previously described brake duct collector. In some embodiments, the wheel well structure 518 is partially or completely removable to provide easy access to the filter 516 for changing or cleaning. In some embodiments, the filter 516 and wheel well structure 518 are configured as an integrated part that is either disposable or cleanable.

The wheel well 502 also includes an air channel 506 formed so that the surface of the filter 516 distal to the wheel well opening 514 is exposed to the air channel 506. Air enters the air channel 506 through an intake scoop 508, which generally faces towards the front of the vehicle, and exits the air channel 506 through an exhaust vent 510. It will be appreciated that as the speed of the vehicle increases, the air flow through the channel correspondingly increases creating a suction (via the venturi effect) that provides for an air flow from the wheel well opening 514, through the vents 504 and the filter 516, and into the air channel 506. Brake dust and other pollutants that are in the wheel well, e.g., resulting from braking or that are liberated from a road as the vehicle moves along the road, can be carried by the above-described air flow to the filter 516 where they are captured. In other embodiments, the air flow from the wheel well opening 514 through the vents 504 can be created by an electrical or mechanical pump or fan.

The filters, duct collectors and pollution trap pads can include resins to bind charged particles. For example, brake dust can have a positive charge induced on the particles resulting from the liberation of the particles from the brake pads or the rotor by friction. Impregnating or coating the filters, dust collectors and pollution trap pads with suitable resins that can bind charged particles. For example, such resins are available from USFilter and can include cation, e.g., Cation, 8% Gel, Model C-211H, Cation, 8% Gel, Model_C-211 NA, Cation, 10% Gel, Model_C-361H, Cation, 10% Gel Model_C-361NA, Cation, 20% Macroporous Model_C-381 H, Cation, 20% Macropourous Model_C-381 NA, Cation, 12% Macroporous Model C-391 H, Cation, Acrylic weak acid, Model C-271, Cation, 10% Gel, Model_C-361 MEG, Cation, 10% Gel, Model_C-373 MEG, and Anion, e.g., Anion, Gel Type 11, Model A-244 OH, Anion, Gel Type 11, Model_A-244, Anion, Gel Type 1, Model A-284 OH, Anion, Gel Type 1, Model A-284 CL, Anion, gel Type 1 Porous, Model A-464 OH, Anion, Gel Type 1 Porous, Model A-464CL, Anion, Macroporous Tyoe I, Model A-674 OH, Anion, Macroporous Type 1 anion A-674 CL, Anion, Acrylic type 1, Model A-714 OH, Anion, Macroporous Type 11, Model A-874 OH, Anion, Macro weak base, Model A-399, Anion, Type 1 Porous Gel, Model_A-464 MEG, and Anion, Type 1 Porous G, Model_A-254 MEG. The filters, duct collectors and pollution trap pads can also include hydrophobic resins e.g., $C_4$-$C_{20}$ resins, including carbon based resins.

Figure 25:
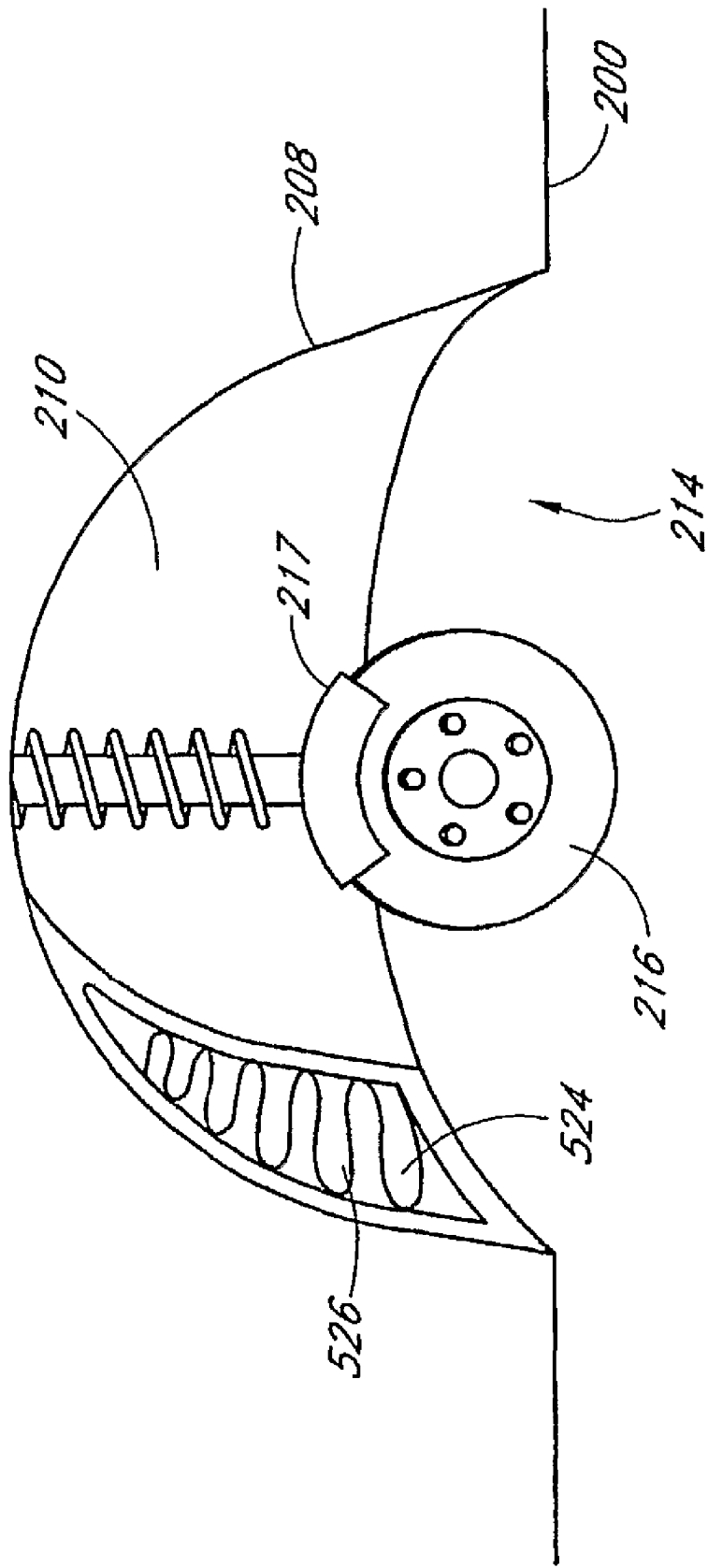
FIG. 25 illustrates an embodiment of a de-icing system for a wheel well.

FIG. 25 illustrates an embodiment of a de-icing system that can be used in conjunction with the other embodiments described herein to ensure the ice-free operation of a pollutant trap and/or a brake dust collector when a vehicle so equipped is operated in snow or freezing temperatures. FIG. 25 shows a wheel well 208 surrounding an opening 214 on a vehicle 200. A typical brake rotor 216 and brake assembly 217 is shown disposed in the wheel well 208. The wheel well 208 and/or the brake assembly 217 can be configured with an embodiment of a pollutant trap and/or a brake dust collector as described hereinabove. A wheel well de-icer 524 having a heating element 526 can be positioned in the wheel well 208 to provide the capability to melt ice or snow that adheres to the wheel well 208, according to one embodiment. As shown in FIG. 25, the de-icer 524 can be positioned on the back portion of the wheel well 208, as this is typically where ice and snow accumulate. In other embodiments, the de-icer 524 can be located anywhere in the wheel well 208 or along the entire surface of the wheel well 208. The de-icer 524 can be formed by a resistive heating element that is connected to an electrical source on the vehicle, according to one embodiment. When desired, a user can activate the de-icer 524, or the de-icer can be activated automatically as a result of a sensor that determines the presence of ice or snow.

Figure 26:
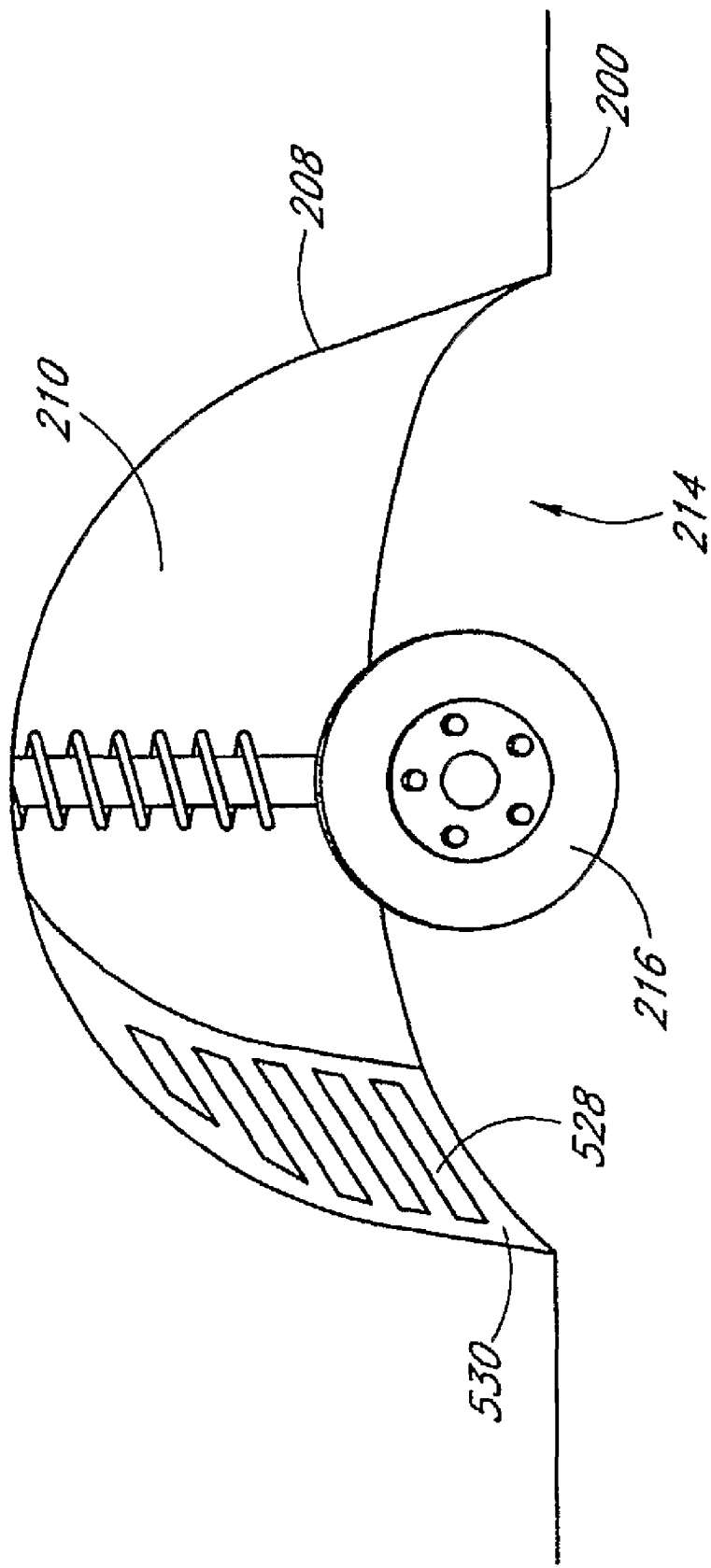
FIG. 26 illustrates an embodiment of a flow-through wheel well.

FIG. 26 illustrates another embodiment of a wheel well 208 that reduces the spray of a vehicle when driving in wet or slushy conditions. The wheel well 208 shown here includes openings 528 in the rear wall 530 of the wheel well 208 that provide a exit port for roadway material (e.g., water, snow, or slush) that is picked up by a tire (not shown) so the material does not hit the rear wall 530 of the wheel well 208 and deflect out of the wheel well 208. In one embodiment, the openings 528 are configured to direct the roadway material to the back of the vehicle 200. In another embodiment, the openings 528 are configured to direct the roadway material to the underside of the vehicle 200.

The following examples describes experiments conducted using prototype pollutant trap 120 to verify that the prototype pollutant trap reduced the amount of hydrocarbons on the roadway surface.

Example 2

A pollutant trap 120 was affixed to the wheel well of a truck, and the vehicle was driven in Hawaii under wet roadway conditions. After driving about 150 miles, the pollution trap 120 was removed and analyzed for the presence of hydrocarbons. The Food Quality Lab of Honolulu, Hi. was employed to independently analyze the amount of petroleum hydrocarbons that had accumulated on the pollution trap.

The data showed that a significant amount of petroleum hydrocarbons had accumulated on the pollution trap during the brief testing period. These results verified that the pollutant trap 120 significantly reduced the amount of roadway pollutants on a wet roadway surface. The following example describes a test that can be performed to verify that the pollutant trap 120 can remove roadway pollutants under dry road conditions, as well.

Example 3

A pollutant trap 120 is applied to the wheel well of a truck, and driven in Hawaii under dry roadway conditions. After driving about 150 miles, the pollution trap 120 is removed and analyzed for the presence of hydrocarbons. The Food Quality Lab of Honolulu, Hi. can be employed to analyze the accumulation of roadway pollutants on the pollution trap. It will be determined that the pollution trap also significantly reduces the amount of roadway pollutants on dry roadway surfaces. The following example describes another test that verified that the pollutant trap 120 effectively removes roadway pollutants.

Example 4

A pollutant trap 120 was affixed to the wheel well of a 2002 Chevrolet Avalanche and the vehicle was driven around the urban areas of Honolulu, Hi. under mixed road conditions (i.e., both wet and dry conditions). After driving about 1500 miles, the pollution trap 120 was removed and was analyzed for the presence of hydrocarbons and heavy metals. An independent laboratory, Advanced Analytical Lab, LLC of Honolulu, Hi. was employed to analyze the accumulation of roadway pollutants on the pollutant trap 120.

The results showed that a significant amount of total petroleum hydrocarbons had accumulated on the pollutant trap 120 during the brief testing period. Additionally, the results showed that a significant amount of heavy metals including barium, chromium, copper, lead, and selenium were also collected onto the pollutant trap 120. These results verified that a system comprising a vehicle and a pollutant trap 120, as described herein, effectively removes hydrocarbons and heavy metals from a roadway surface. The next example provides more proof that embodiments of the invention described herein effectively remove pollutants from the environment.

Example 5

Different pollutant traps 120 were affixed to the wheel wells of a Nissan Frontier/King cab pick-up truck that was driven around the urban areas of Las Vegas, Nev. under mixed road conditions (i.e., wet or dry conditions). After driving approximately 402 miles, 681 miles, 1415 miles, or 3278 miles, the pollutant traps 120 were removed and were analyzed for the presence of hydrocarbons, heavy metals, and various chemicals. An independent laboratory, NEL Laboratories of Las Vegas, Nev. was employed to analyze the accumulation of roadway pollutants on the pollutant traps 120.

In a first set of experiments, the same type of pollutant trap 120 was tested under dry and wet road conditions. The results showed that a significant amount of total petroleum hydrocarbons (TPH) had accumulated on the pollutant trap 120 in both wet and dry conditions. For example, a 2.5 inch×2.5 inch square cut from the filter accumulated approx. 6.5 mg total TPH under dry conditions (approx. 0.04 fl. oz of total TPH/sq. inch) and 17.2 mg TPH (approx. 0.11 fl. oz of total TPH/sq. inch) under wet conditions. Appreciable amounts of heavy metals including barium, cadmium, chromium, and lead were also collected onto the pollutant traps 120 and volatile chemicals such as dibromofluoromethane, toluene, and 4-bromofluorobenzene had also accumulated on the pollutant traps 120. These experiments verified that the pollutant trap 120 effectively removed hydrocarbons, heavy metals, and volatile chemicals from the environment under wet or dry road conditions.

In a second set of experiments, the ability of different pollutant traps to accumulate hydrocarbons, heavy metals, and chemicals were compared under dry road conditions. Both types of pollutant traps 120 were found to be effective at removing total hydrocarbons, heavy metals, and chemicals from the environment. In fact, the amount of hydrocarbons accumulated on one type of pollutant trap 120 was more than 4 times the amount of hydrocarbons than was found present on the control (unexposed) section of pollutant trap 120. The results showed that barium, cadmium, chromium, copper, lead, silver, mercury (on one type of filter), 4-bromofluorobenzene, dibromofluoromethane, and toluene had accumulated. These results provide more evidence that a system comprising a vehicle and a pollutant trap 120, as described herein, effectively removes hydrocarbons, heavy metals, and chemicals from the environment. Roadway tests as provided in the examples above are to be conducted in all 50 states of the United States and various countries throughout the world, as described in the following example.

Example 6

Pollution traps 120 are applied to the wheel wells of several vehicles, and driven in all 50 states under wet and dry conditions and in several foreign countries. After driving about 1000 miles, the pollution traps 120 are removed and analyzed for the presence of roadway pollutants by, for example, The Food Quality Lab of Honolulu, Hi. These experiments will show that the amount of roadway pollutants, such as hydrocarbons and toxic metals, can be reduced in all 50 states and in several countries throughout the world by employing the pollution trap 120 described herein.

| Particle Size Range (μm) | Exposed Material % by Particle Area | Exposed Material % by Number of Particles |
|---|---|---|
| 0.178-0.316 | .9 | 31.8 |
| 0.316-0.562 | 3.2 | 37.5 |
| 0.562-1 | 5.2 | 18.1 |
| 1-1.78 | 6.5 | 6.9 |
| 1.78-3.16 | 9.8 | 3.4 |
| 3.16-5.62 | 13.1 | 1.4 |
| 5.62-10 | 19.3 | 0.6 |
| 10-17.8 | 16.8 | 0.2 |
| 17.8-31.6 | 25.1 | 0.1 |
| 31.6-100 | None Detected | None Detected |

Example 7

A pollution trap 120 was applied to the wheel wells of a vehicle and driven in all Nevada under wet and dry conditions. After driving about 3000 miles, the pollution trap 120 was removed and analyzed for the presence of roadway pollutants by, EMSL Analytical, Inc ("EMSL") of Westmont, N.J. EMSL used a combination of polarized light microscopy, scanning electron microscopy, transmission electron microscopy, energy dispersive X-ray spectrometry, and X-ray diffraction to analyze the particles deposited on the pollutant trap. EMSL identified the following concentration (percentages) of particles: quartz 23%, calcite 20%, dolomite 17%, other minerals 2%, calcium silicate 25%, steel fragments 2% and unidentified organics 11%. EMSL also identified the following information related to particle size distribution on the exposed pollutant trap pad:

Table 1 Particle Size Distribution

This experiment showed that a pollutant trap 120 can remove roadway pollutant particles of various compositions under a variety of conditions and thereby reduce the amount of roadway pollutants.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof. All of the references cited herein are expressly incorporated by reference in their entireties.

What is claimed is:

1. A system for capturing pollutants from a wheel well opening of a vehicle, comprising:
    a wheel well structure between a wheel well opening and a filter, said wheel well structure having a plurality of surface openings, wherein the surface openings are exposed to pollutants in the wheel well opening;
    an air channel defined by said filter and a wheel well, said air channel being disposed behind said plurality of openings, said air channel comprising an air intake port and an air outlet port, and said air channel generating a first air flow in the resulting second air flow in the surface openings and caused by the first air flow to move pollutants in the wheel well through said plurality of openings and towards the air channel when the vehicle is moving forward;
    said filter being positioned between said air channel and said plurality of openings, wherein said filter comprises a first surface disposed along said air channel and exposed to said air channel, and a second surface disposed proximate to the plurality of openings so that at least a portion of pollutants moving through said plurality of openings towards said air channel are captured by said filter.

2. The system of claim 1, further comprising:
    a de-icer element positioned on a wheel well for melting snow or ice accumulated on the wheel well; and
    a power source connected to said de-icer element, said de-icer element configured to produce heat when energized by said power source.

\* \* \* \* \*